United States Patent [19]

Bednar, Jr. et al.

[11] Patent Number: 4,630,196
[45] Date of Patent: Dec. 16, 1986

[54] STORE AND FORWARD FACILITY FOR USE IN MULTIPROCESSING ENVIRONMENT

[75] Inventors: Joseph A. Bednar, Jr., Middletown; Richard L. Bennett, Lincroft; Charbak R. Dutt, Howell; Michael K. Stafford, Red Bank, all of N.J.

[73] Assignee: AT&T Information Systems, Inc., Holmdel, N.J.

[21] Appl. No.: 484,474

[22] Filed: Apr. 13, 1983

[51] Int. Cl.$^4$ ............................................. G06F 13/38
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,316,245 | 2/1982 | Luu et al. | 364/200 |
| 4,325,120 | 4/1982 | Colley et al. | 364/200 |
| 4,369,494 | 1/1983 | Bienvenu et al. | 364/200 |
| 4,374,409 | 2/1983 | Bienvenu et al. | 364/200 |
| 4,395,757 | 7/1983 | Bienvenu et al. | 364/200 |
| 4,445,176 | 4/1984 | Burk et al. | 364/200 |
| 4,500,960 | 2/1985 | Babecki et al. | 364/200 |

OTHER PUBLICATIONS

M. M. Rochkind, "Service Concepts Underlying ACS", Jun. 10–14, 1979, *International Conference on Communications Conference Record*, pp. 38.1.1–38.1.6, Boston, Mass.
Babecki et al., Case 1-1-1-1-1-1-1-1-1, Ser. No. 393,111, filed Jun. 28, 1982.

*Primary Examiner*—James R. Hoffman
*Attorney, Agent, or Firm*—Daniel D. Dubosky

[57] ABSTRACT

A store and forward facility for use in a multiprocessing, multinode environment is disclosed wherein two fundamental processes (transfer and delivery) perform the bulk of the activities required in this facility. A transfer process permits the creation of a message by an originating applications process and transfers this message to a similar transfer process in each of the nodes to which the message is to be delivered. This message is then in turn transferred to a delivery process which maintains a work item for each message to be delivered to a destination applications process and causes a notification to be sent to that destination application process when an earliest delivery time specified in the message has been reached. The delivery process causes the destination applications process to be created if that process is not currently executing. The message is delivered in response to a request from the destination applications process, and a confirmation message is generated and transferred back to a specified location only when the destination applications process sends a release message to its corresponding delivery process.

16 Claims, 35 Drawing Figures

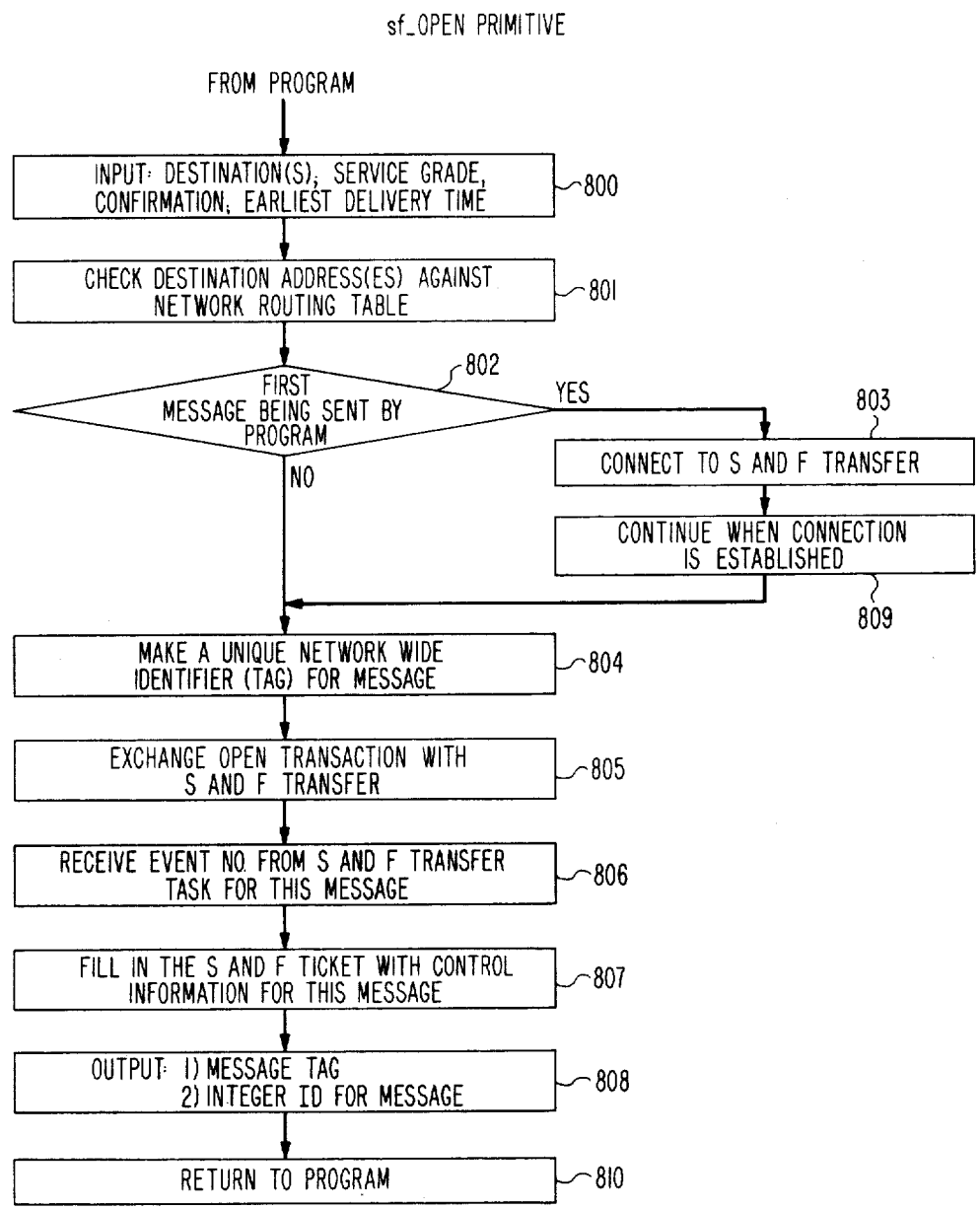

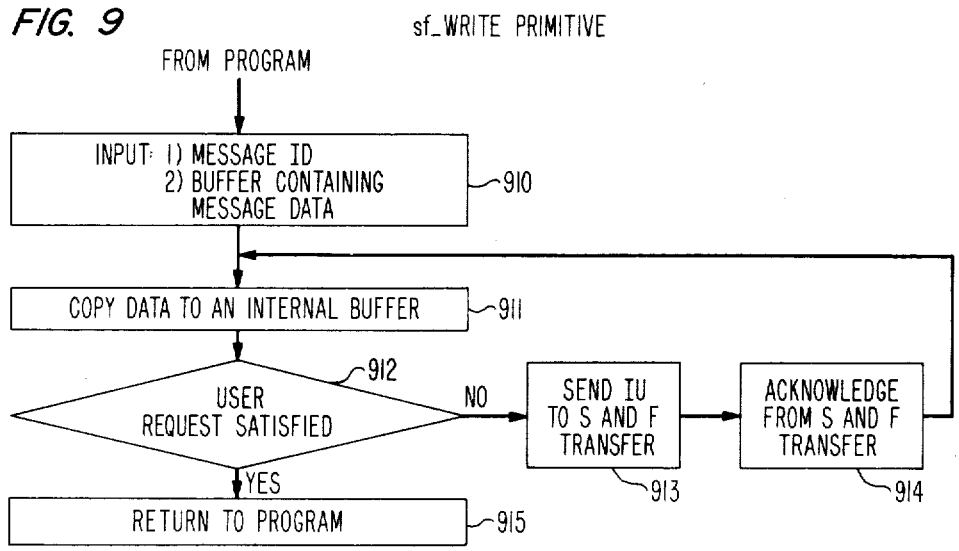
FIG. 9    sf_WRITE PRIMITIVE
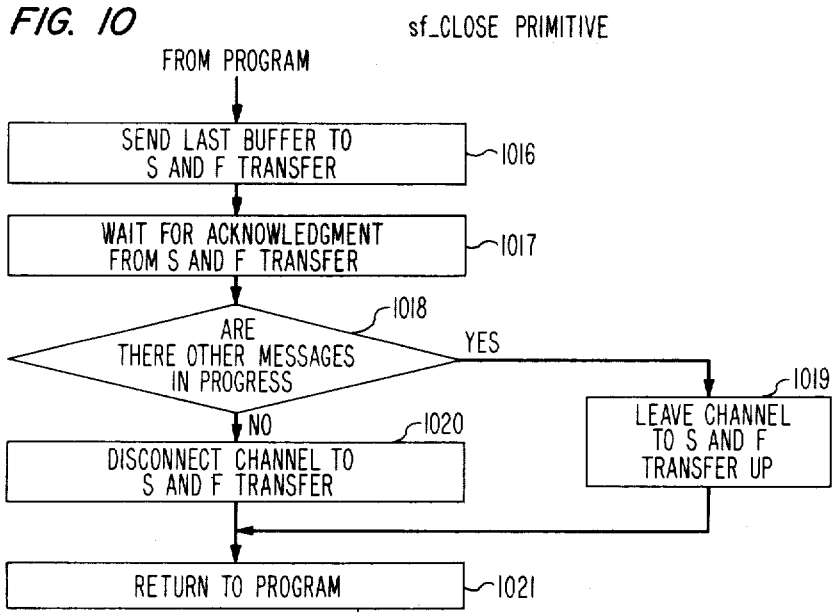
FIG. 10    sf_CLOSE PRIMITIVE

FIG. 14

TICKET INFORMATION

1) MESSAGE TAG
2) GRADE OF SERVICE
3) EARLIEST DELIVERY TIME
4) MESSAGE LENGTH
5) SENDER'S NETWORK ADDRESS
6) SENDER'S CUSTOMER ACCOUNT
7) DESTINATION NETWORK ADDRESSES
8) CONFIRMATION NETWORK ADDRESS
9) NUMBER OF DESTINATIONS
10) NOTIFICATION TIME AT DESTINATION
11) SUCCESS/FAILURE CODE SUPPLIED BY SYSTEM
12) CONFIRMATION CODE SUPPLIED BY USER
13) "POSSIBLE DUPLICATE" FLAG

FIG. 15

MESSAGE TAG STRUCTURE

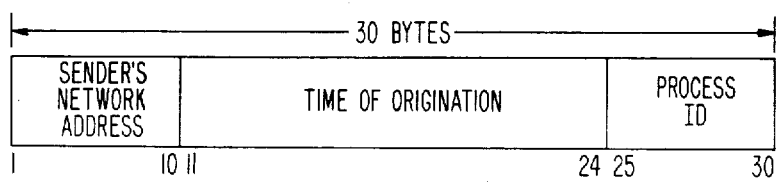

FIG. 16

STORE AND FORWARD TRANSFER MAIN TASK

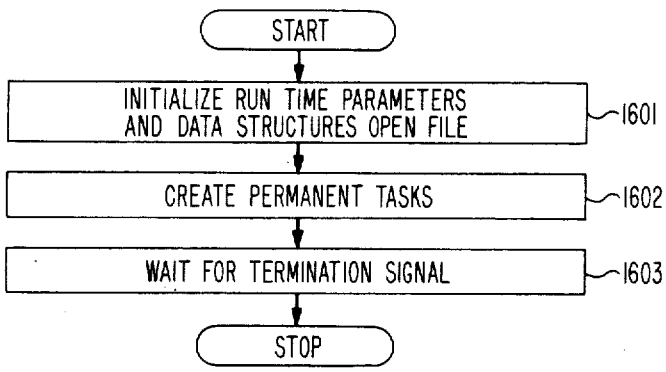

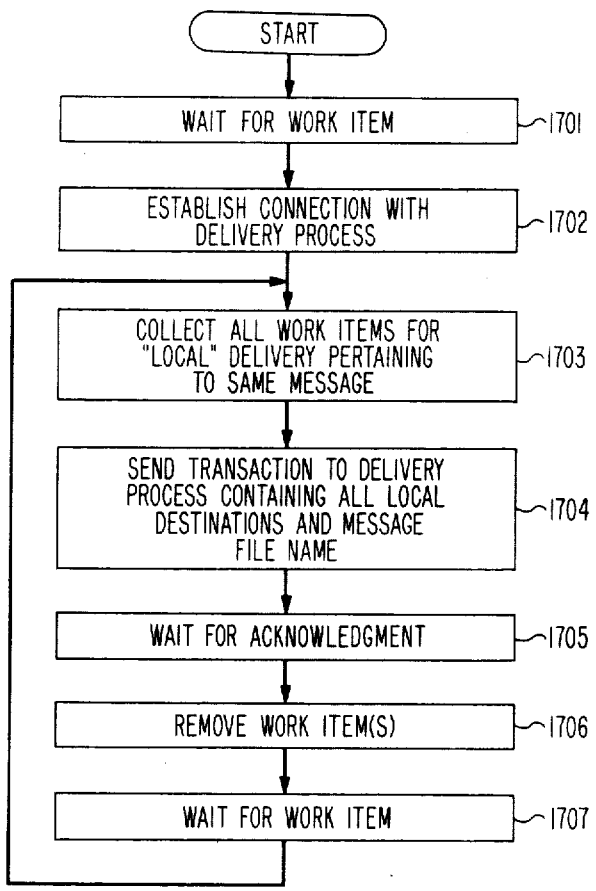

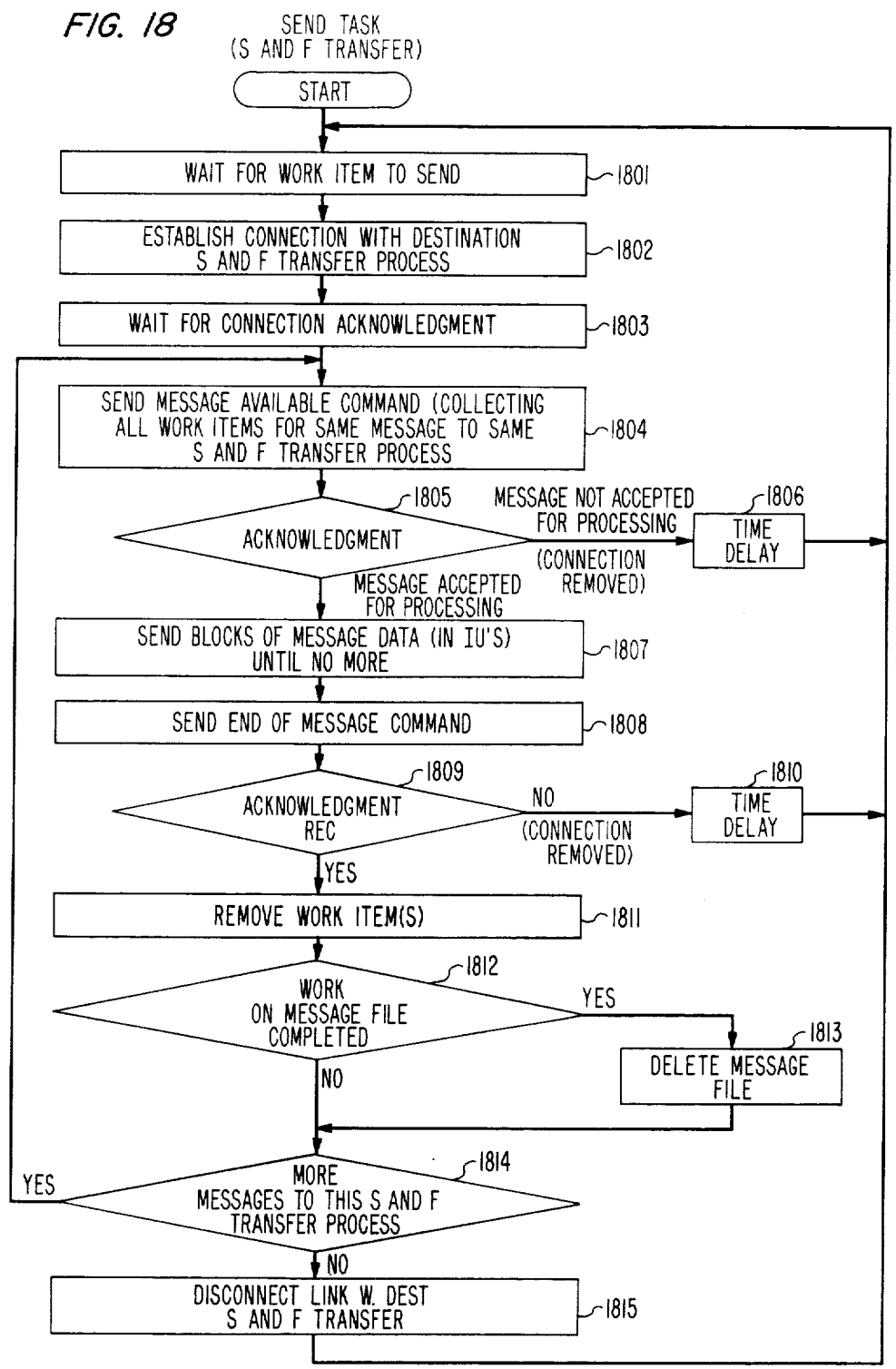

RECEIVE TASK
(S AND F TRANSFER)

MESSAGE CREATION TASK
(S AND F TRANSFER)

STORE AND FORWARD FACILITY FOR USE IN MULTIPROCESSING ENVIRONMENT

BACKGROUND OF THE INVENTION

This invention relates to a message processing facility for transfer of message information from one computer process to another and, more particularly, to a message processing facility of the store and forward type where there is an element of time separation added to the transfer.

Store and forward message processing is one type of program-to-program data communication mechanism. There are, of course, other types of program-to-program communication mechanisms, and a brief description of the other types helps illustrate the properties of the store and forward type. A common form of data communications is a file. One program writes a file and another one reads it. The only coupling between the two programs is the name of the file. Synchronization between the two programs is not defined and usually is implemented by the developers of the programs by serializing the programs execution, that is, with a command or job control language. This type of data communications is of limited use in geographically distributed systems since, in many cases, a distributed file system is not supported.

Another type of communication mechanism is a virtual call. With this type mechanism, the two programs may execute anywhere in the network of the system, and both programs and a communications path must exist at the same time. Both programs must be willing to accept and/or respond to data in a real time manner. This virtual call mechanism may, of course, be used in geographically distributed systems.

The store and forward communications mechanism may also be used in distributed systems. The main difference between this mechanism and the virtual call mechanism is that the programs and communication path are decoupled. That is, they do not have to exist simultaneously. In addition to the space separation typical of the call mechanism, there is an element of time separation. As a result, store and forward permits a program to issue data transfer requests that are less time critical. Accordingly, store and forward can control those requests in a way that may decrease peak load on the transmission system and on the CPU resources thereby yielding a lower cost for the transfer service. The decoupling permits a simple interface for the programs and recovery from congestion and network failure is also less complicated. Store and forward is not appropriate for programs requiring real time interactions.

The Advanced Information Systems (AIS)/Net1000 is a shared switched network service for data communications users. It will permit the interconnection of a wide variety of multi-vendor terminals and computers. It will offer at least two types of message handling facilities. One type of message handling facility will permit the bidirectional transfer of information between two terminals and/or computers on a simultaneous basis. This first type of message handling facility has been previously labeled in the Advanced Information Systems as the standard call feature. See, for example, the article entitled "Service Concepts Underlying ACS," by Mark M. Rochkind, *International Conference on Communications Conference Record*, Vol. 3, Boston, MA, June 10-14, 1979, pp. 38.1.1-38.1.5.

A second type of message facility in the AIS system (previously called ACS for Advanced Communications Service) was labeled in that article as the standard message feature. In this message facility, the concept of time separation is added to the space separation typically present in the transfer of information. The messages generated at an originating location are first collected in some message storage area, and these messages are then transmitted to a destination node at which point they are again held for delivery to the destination or target station. There are several grades of service that are typically provided which have as a goal the transport of data across the network within seconds, minutes or hours, depending on the grade of service. In the system which was described in the above-identified article, the responsibility to establish the priority sequence used to accomplish the delivery of a message from the message arrival area in the destination node remained with the local terminal or computer at the destination target. It was, therefore, the responsibility of the destination target, be it terminal or computer, to at some time, retrieve its messages from the message arrival area.

Another message delivery option which was offered in that proposed system was that of delivery confirmation. This option provided the originator or speciified confirmation program with information about the fact that the message was delivered to the target station. One difficulty with this previously disclosed system is that the decision as to how and when the message will be delivered was the responsibility of the destination station. As suggested in the above-identified article, this could be done by automatic polling at a continuous or periodic basis or by scheduling the retrieval of the message to occur at some prescheduled time. In the case where the message is destined for a process that has not been activated for some other purpose, the messages that are delivered for that process could remain in the message arrival area for extended periods of time with no prospect of delivery and thus presenting a difficulty in terms of when confirmation should be sent.

SUMMARY OF THE INVENTION

The above-mentioned problem is solved in accordance with the present invention wherein the message handling facility in a communications service is caused to create the process (provided it does not already exist) at the destination location node to insure that the delivery of the message will occur within a reasonable amount of time after it is intended to be delivered. Furthermore, the present invention provides the delivery option of confirmation but provides the confirmation only after a release of the message has been provided by the user's destination program. It is the destination program in the present invention which determines when a confirmation is to be transmitted. Hence the confirmation is totally within the control of the destination program, and accordingly, the customer can be insured that the system is released of its responsibility only after the user is totally satisfied that the message has been delivered.

A feature of the present invention provides for the creation of a work item for each destination of a message. The work items at a destination node of the system are ordered in a queue in accordance with some predetermined time criteria, and an attempt is made to deliver the message when the time corresponding to the work item is reached. In the specific embodiment described, two work item lists are kept in a delivery process. One of the lists is ordered in accordance with an earliest delivery time specified in the message. The other list is ordered in accordance with a notification time at which delivery is to be attempted.

BRIEF DESCRIPTION OF THE DRAWING

The invention will be more readily understood after reading the following detailed description in conjunction with the drawings wherein:

FIGS. 8 through 13 are flowcharts for the primitives that are present in the control layer image of each of the application processes depicted in FIG. 3 that use the present invention;

FIGS. 14 and 15 are lists of the information that is presented to accompany each of the messages transferred in the system;

FIGS. 16 through 23 are flowcharts for the tasks associated with the store and forward transfer process;

DETAILED DESCRIPTION

Figure 1:
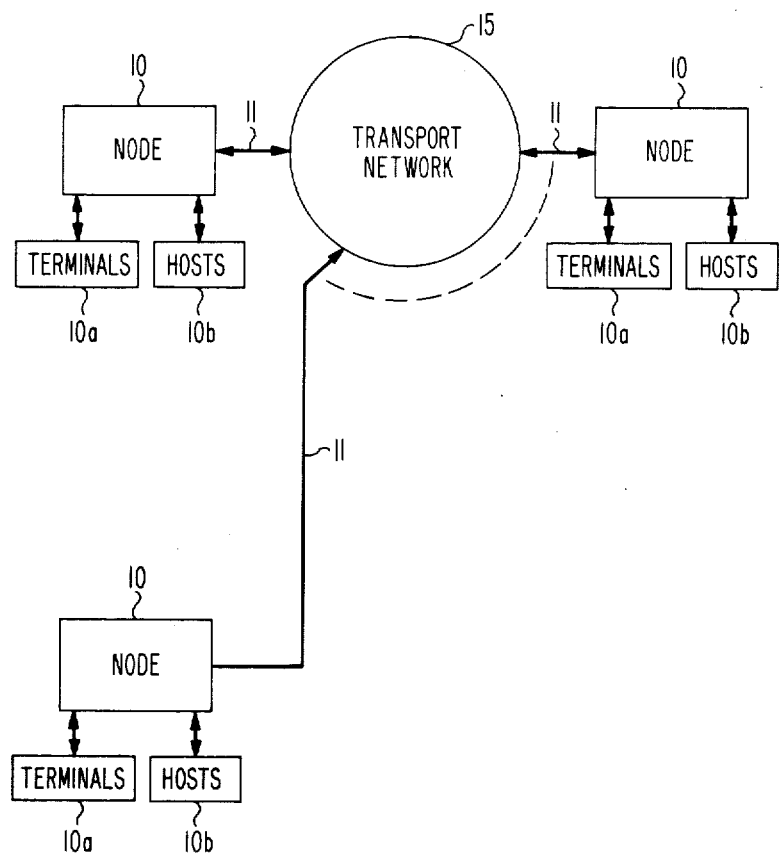
FIG. 1 is a schematic block diagram of a system in which the present invention can be practiced.

FIG. 1 depicts a system which provides an integrated data processing and communications service (hereinafter referred to as the "communications service" or, simply, the "service") to a plurality of customers. The system includes a number of nodes 10 which are located on the premises of the vendor of the service. At the heart of each node are one or more digital computers as described below. A plurality of data terminals 10a and host computers, or hosts, 10b are connected to nodes 10 via suitable data lines. Most of the terminals and hosts belong to the customers and are located on their premises. Some, however, belong to, the vendor and are used, for example, for system management. Nodes 10 communicate with each other via a packet switched transport network 15. The nodes are connected to the transport network via respective links 11 which carry data at 56 kb/s using a protocol which conforms to CCITT standard X.25. Various nodes may be dedicated to specific functions, such as billing, service provisioning, maintenance, etc.

The communications service provides the customers with a number of capabilities. These include timeshared execution of customer- and vendor-provided application programs stored within the nodes; storage of customer data in databases maintained within the nodes; support of customer-program-callable software "building blocks" that provide such services as editing, command interpreting, forms facilities and the like; a distributed processing capability wherein processes executing at various nodes can communicate on a timecritical basis with processes executing at other nodes; and finally, the subject of this patent, a store-and-forward message service.

Figure 2:
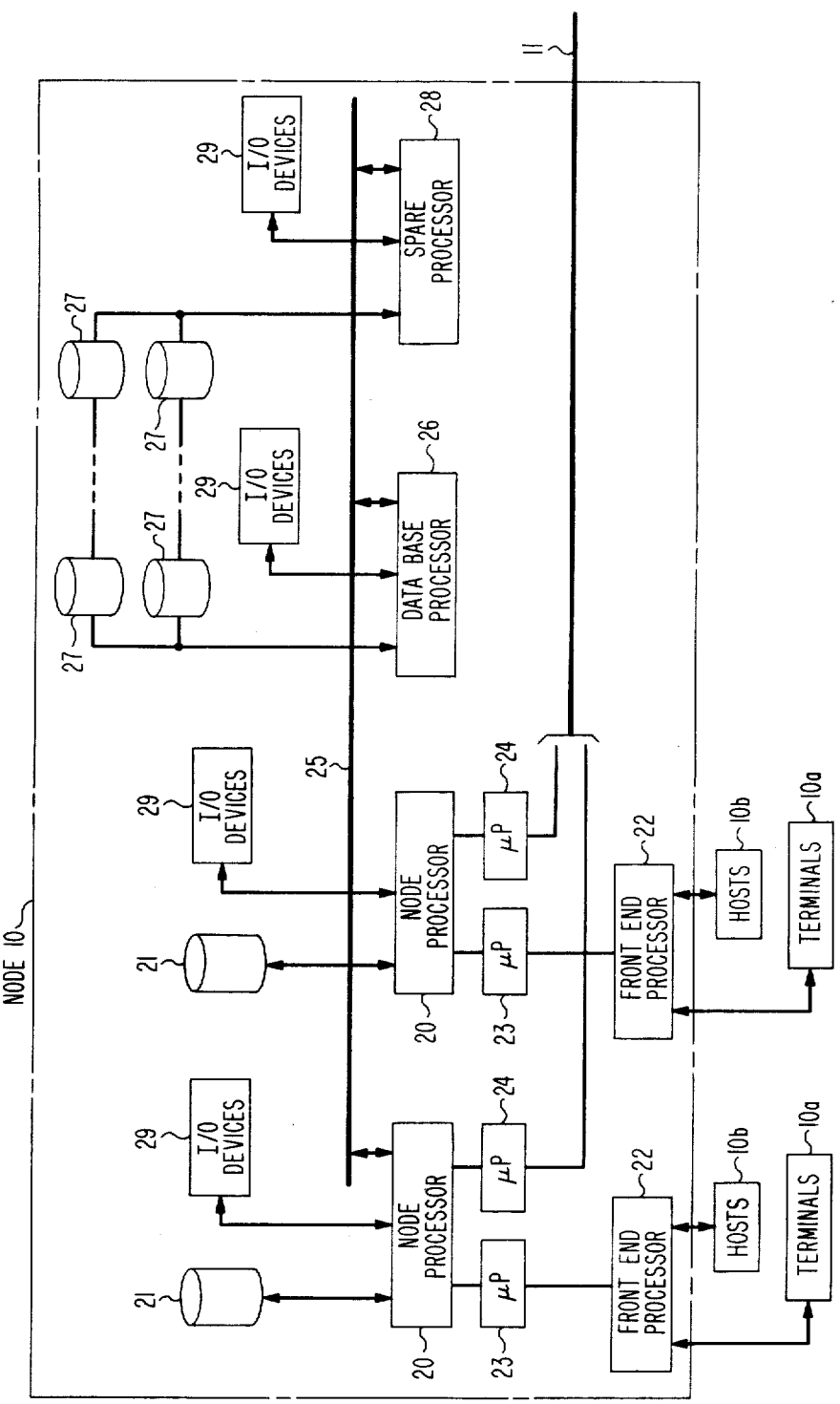
FIG. 2 is a schematic block diagram of the hardware implementation of the node illustrated as a block in FIG. 1.

FIG. 2 is a block diagram of an individual node 10. The node illustratively includes two node processors 20 and a database processor 26. Each of these processors is illustratively a Digital Equipment Corporation (DEC) VAX 11/780 computer running under the DEC-supplied VMS operating system. The node further includes a spare VAX 11/780 processor 28 which can take the place of either the database processor or one of the node processors. Other nodes 10 (FIG. 1) may have one or more node processors, depending on the anticipated processing demand. Communication among the processors is carried out via bus 25, which illustratively is a DEC-supplied PCL (parallel communication link) bus.

Mass storage, e.g., disk units 21 are associated with each node processor and mass storage units 27 are associated with database processor 27. Mass storage units 27 are dual ported with, and thus can be accessed by, spare processor 28. Associated with each of the four processors are general purpose input/output (I/O), e.g., CRT, terminal devices 29.

Also associated with each node processor is at least one front-end processor 22 which provides an interface between the node processor, on the one hand, and associated terminals 10a and hosts 10b, on the other hand. Front-end processors 22 are, illustratively, IBM Series/1 computers running under the IBM-supplied RPS operating system. Each front-end processor communicates with its respective node processor using an X.25 protocol. DEC-supplied firmware controlling a DEC-supplied microprocessor 23 performs the DTE role in Level 2 (the "link" level) of the protocol. Another microprocessor 24 associated with each node processor serves a similar function with respect to X.25 communications over link 11.

The function of node processors 20 is to execute programs on behalf of the customers and the vendor. To this end, the mass storage units 21 associated with each processor are used primarily, if not exclusively, to support the processing currently going on in that processor. Virtually all data, programs and other files, both those belonging to the customer and those belonging to the vendor, are stored in databases contained within mass storage devices 27. The function of the database processor is to manage the databases and to provide the node processors with access to it.

Figure 3:
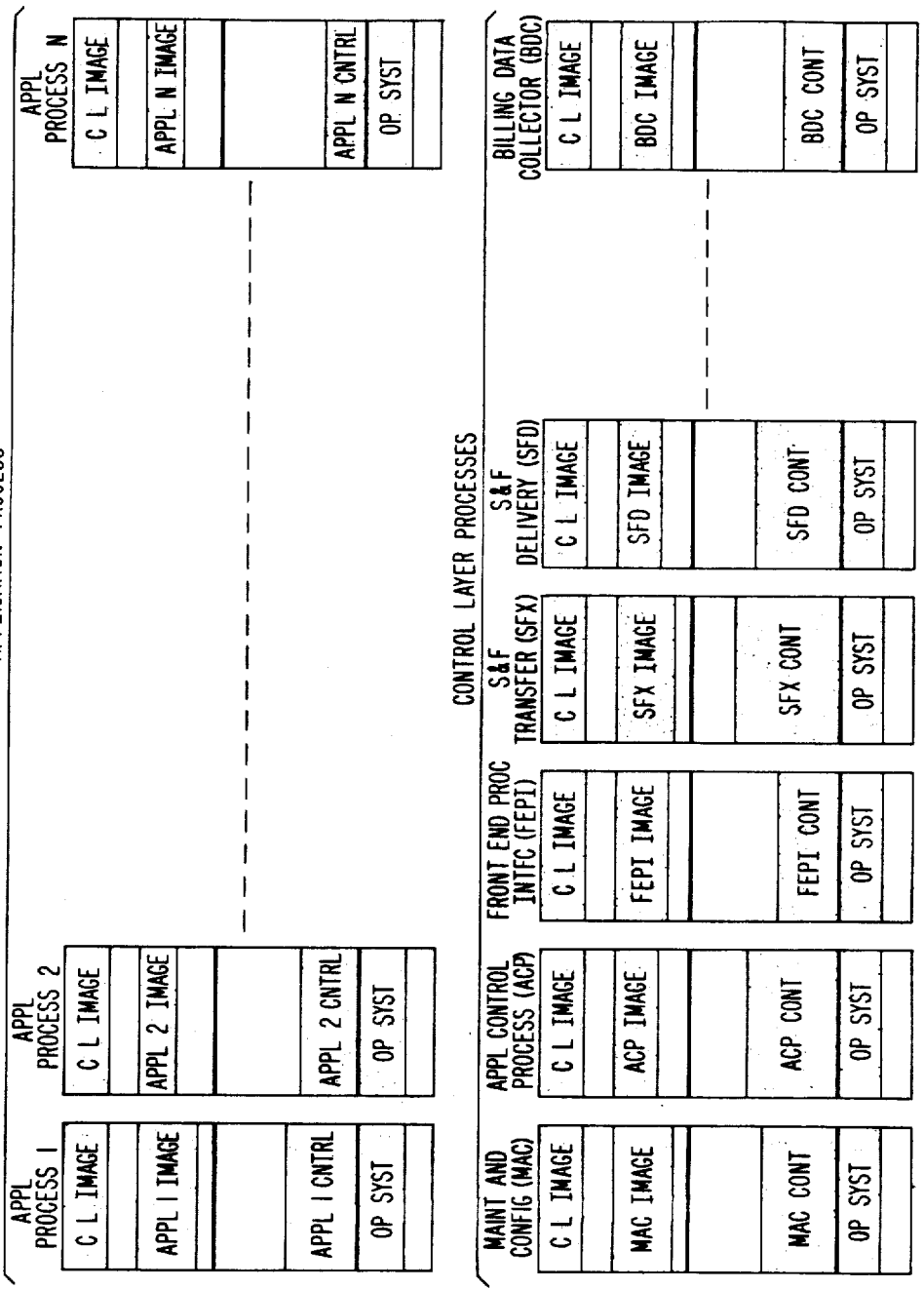
FIG. 3 is a collection of memory maps for the processes that are run on the processors illustrated as blocks in FIG. 2.

The type of software that is available to run on each of the processors is illustrated in FIG. 3 of the drawing. In particular, FIG. 3 depicts the virtual memory maps of a number of processes within one of the processors.

The processes are illustratively categorized into two types—application processes and control layer processes. Each application process executes an image on behalf of a customer or the vendor in performance of some "useful work." Typical customer application processes execute programs such as payroll and or accounting, database manipulation and file management, text editing, etc. The program code for any particular one of these programs may be supplied totally by the customer, totally by the vendor, or by the customer using software building blocks supplied by the vendor. Typical vendor application processes execute programs such as logon, billing, etc.

The control layer processes execute on behalf of the vendor and each of them manages, or provide some part of, the communications service itself. Each of the control layer processes exists on at least one of the processors as long as the node is in operation, and many of the control layer processes exist in each of the processors. FIG. 3 depicts the virtual memory maps of various control layer processes, which will now be described briefly.

The Maintenance and Configuration (MAC) process exists within each processor and is the first process to be created when the processor is started up. One of its principal functions is to create the other control layer processes via calls to the VMS process creation service. Other functions include coordination of processor quiescence—termination and switchover and detection thereof—and overseeing the recovery from various hardware and control layer software errors.

The Application Control Process (ACP), which is part of the application control subsystem, discussed hereinbelow, exists within each node processor. Among its functions are to create and terminate all application processes; control the logical environment in which stations, i.e., terminals and hosts, operate; and construct and maintain profiles associated with the various programs running in, and stations communicating with, the processor.

A separate Front-End Processor Interface (FEPI) process, exists within each node processor, for each front-end processor associated therewith. It serves as the gateway for communication from the front-end processor to the rest of the node.

The Store-and-Forward (S&F) Transfer and Store-and-Forward Delivery processes each exist on only one processor of each node. A store-and-forward operation is initiated when an application process causes a store-and-forward message and its associated control information (e.g., destination, grade of service, etc.) to be stored in files via calls to store-and-forward "primitives" discussed hereinbelow. The S&F Transfer process thereafter "picks up" the message and invokes an internal communications subsystem to transfer the message to the S&F Delivery process within the destination node. The latter arranges for delivery of the message to the intended destination.

The Billing Data Collector (BDC) process collects billing records generated during the execution, and at the termination, of each customer application process. It also sorts the records and prepares billing activity summaries.

Although not all shown in the drawing, a number of processes—all control layer processes—exist only within database processor 26 (FIG. 2). These include, for example, a so-called database work manager, and a number of database servers. The virtual memory maps of those processes are structured in the same way as the virtual memory maps of the processes within node processors.

The program region for each application and control layer process must, of course, include an image whose program code carries out the "useful work" that the process was created to do. As shown in FIG. 3, the program region of each address space includes not only this so-called "process-specific" image, but a second image—referred to as the shared or control layer (C.L.) image. The latter, which is identical for each process, is weakly linked with the process-specific image (as described below) and provides an operating environment for it. In particular, the control layer image makes available to the process-specific image a number of communications processing services, including services in the following categories: file/database management, application program control, internal (i.e., interprocess) communications, station access and message services. Such services can also be called upon from within the control layer image itself.

The software which provides any particular category of communications processing services is referred to herein as a "subsystem." Some of the subsystems are totally contained within the control layer image. The principal subsystems in this category are the internal communications, application data transfer and buffer management subsystems. Other subsystems comprise a combination of control layer image code with one or more processes (each of which, in turn, includes the shared or control layer image within its own virtual address space). The principal subsystems in this category are the applications control, database manager and store-and-forward subsystems.

Each subsystem includes a set of subroutines, referred to as "primitives," via which its services are invoked. Each subsystem also includes primitives which are called internally within the subsystem to carry out its functions and are not intended to be called from outside of the subsystem.

The internal communications (IC) subsystem provides a connection-oriented mechanism (also referred to as calls or virtual circuits) for intra-processor, intra-node and inter-node communications. The endpoint for an IC connection can be a control layer process such as the S&F subsystem, a station call facility or a control layer subsystem within an application process. The IC subsystem includes primitives which enable a process to (a) initiate, splice, forward, redirect and terminate connections, (b) read and write data over them, and (c) obtain various pieces of connection-related information. There are many types of software systems that can serve to provide the process-to-process communications required of the IC subsystem. A preferred embodiment of this subsystem can be found in the patent application Ser. No. 393,111 by G. R. Babecki et al, entitled "Geographically Distributed Multiprocessor Time-Shared Communication Processing System."

Figure 4:
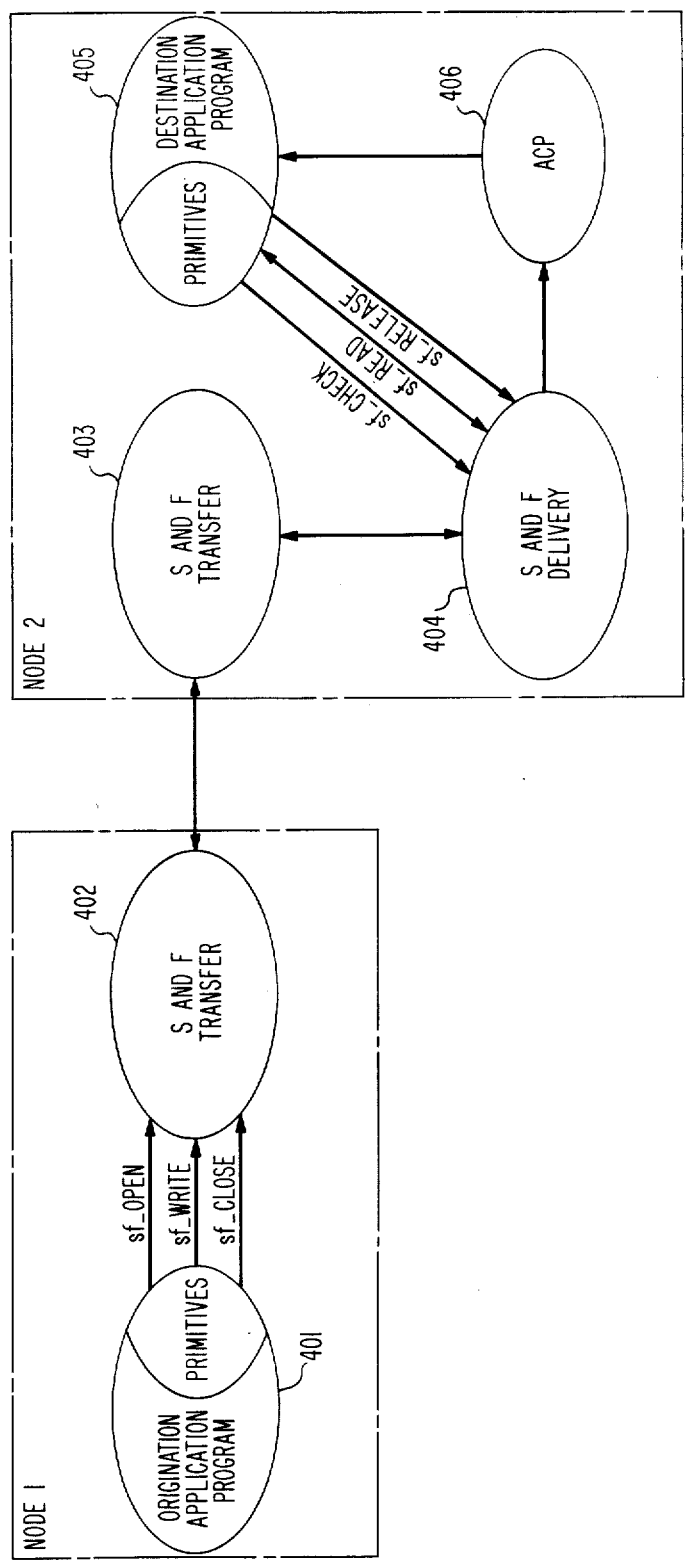
FIG. 4 is a block diagram that illustrates the transactions that take place between the various processes used in the practice of the present invention.
Figure 5:
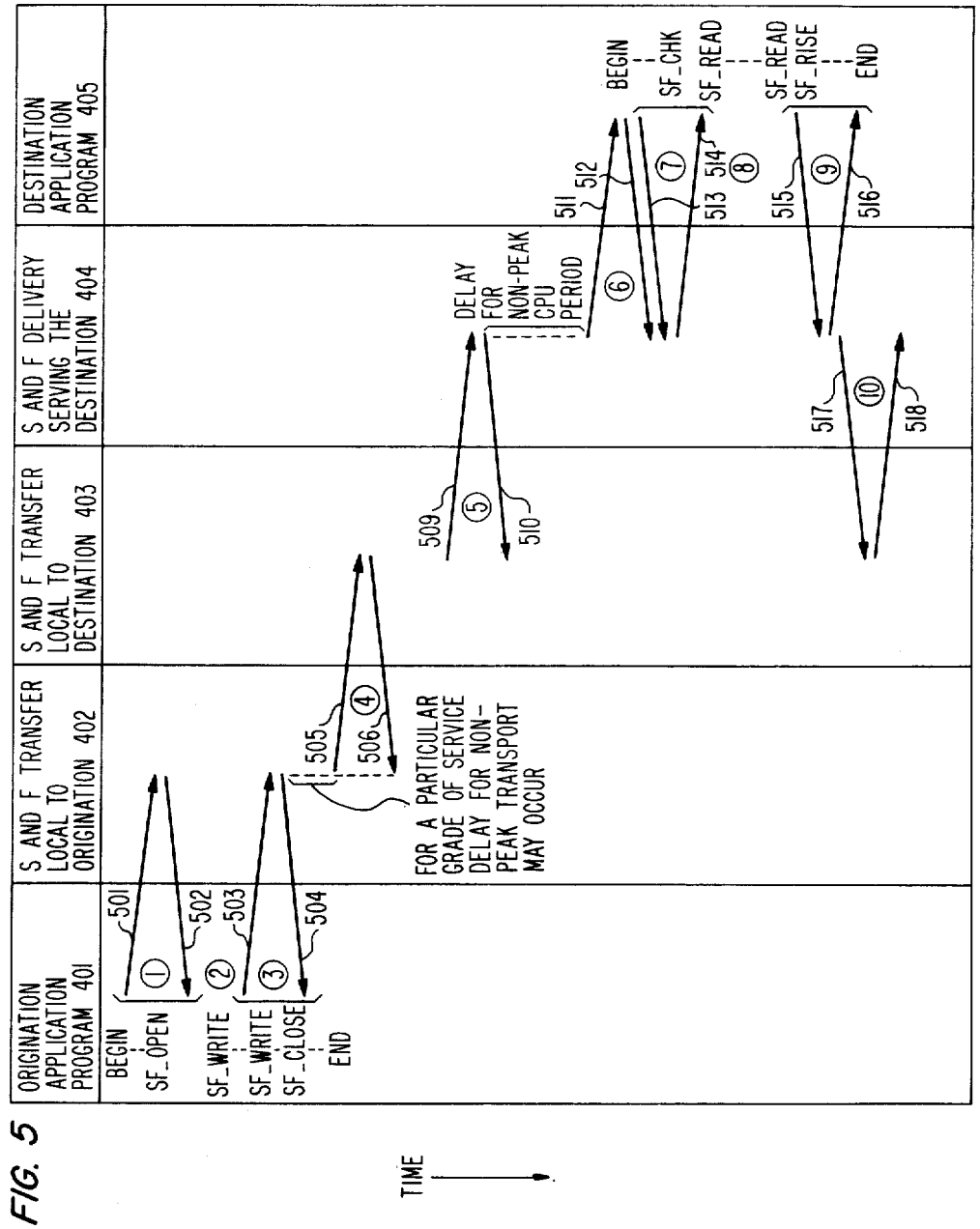
FIG. 5 is a time chart that illustrates the sequence of transactions that take place between the processes shown in FIG. 4.

The overall aspects of the store and forward subsystem are illustrated in FIGS. 4 and 5 of the drawing. Both of these figures trace the flow of a message from an origination program to a destination program. The chart of FIG. 4 shows an origination application program and a Store and Forward Transfer process in node 10 of a communications system of the type discussed hereinabove in connection with FIG. 1. This origination program 401 is one of the application processes whose memory maps are shown in FIG. 3 discussed hereinabove. As pointed out hereinabove, each of these programs have a shared image called the control layer image and this shared image has primitives that are available to the code of the origination program. The destination program shown as 405 in FIG. 4 is illustrated as being in a separate node from that of the origination program, but it should be apparent to those skilled in the art that this destination program may in fact be present in the same node. The chart shown in FIG. 5 contains much of the same information as the chart in FIG. 4 except that FIG. 4 gives a sense of the physical separation of the various processes and FIG. 5 gives an indication as to how these processes interact in a time sequence.

The origination application program 401 is assumed to execute to a point at which it is desired to send a message to the destination application program 405. The origination program 401 begins to send this message by invoking an sf_open primitive in the control layer image. All transfer parameters are specified as arguments to this primitive. These parameters are validated and a transaction request 501 is sent to the local Store and Forward Transfer process 402 to verify that enough local buffer space is available for a new message and that the local transfer process is enabled to receive new messages. Two processes are said to be "local" in this specification if they are in the same node. When the Store and Forward Transfer process 402 responds with a transaction 502, the sf_open primitive returns to the application program. If the sf_open primitive returns a success indication, the origination program 401 can then begin to enter its message.

At this point, the origination application program 401 invokes an sf_write primitive which permits the program to sequentially add data to the message by copying it from the application program's address space into a message buffer. The sf_write primitive does not impose any structure on the message other than that it be a sequence of bytes. The application program may impose any structure that is convenient such as a header and/or some record delimiters, but these structures are completely transparent to the store and forward system. After entering all of the message by issuing one or more sf_write primitives, the application then issues an sf_close primitive.

As the application is issuing sf_write primitive calls, the control layer image of the application is successively breaking the message into a message buffer of a fixed size. If the total message size exceeds that buffer size, transactions containing each buffer would be sent to the local Store and Forward Transfer process 402 and a response indicating receipt of the buffer would be returned to the sf_write primitive. The last buffer is sent when the sf_close primitive is issued by the application.

The sf_close primitive sends a transaction request 503 to the local Store and Forward Transfer process 402 with information about the message buffer that has been accumulated by the sf_write primitive calls. Upon receiving this transaction 503, the S&F Transfer process 402 schedules the message for transfer to the destination node and sends a response 504 back to the sf_close primitive to indicate that it has assumed responsibility for transferring the message to the destination program and for returning a confirmation of the transfer request if a confirmation is requested as part of the original transfer parameters. The sf_close primitive then returns control to the application program which can then proceed to do other processing.

The S&F Transfer process 402, which is local to the origination program, then attempts to transfer the message to an S&F Transfer process 403 that is local to the destination program. The time of transfer may be delayed until a non-peak period of activity is present on the transport network. In the embodiment which was constructed, the delay for a non-peak transport period was implemented by selecting a priority for the Store and Forward Transfer which would execute only when a transport network was relatively free of other traffic. The transfer of data is illustrated in FIG. 5 by the transactions designated as 505-506 between the S&F Transfer process 402 and the S&F Transfer process 403. If a node failure at the origination occurs before a final response is received from the transfer process 403, the message may again be transmitted with a "possible duplicate" flag turned on.

Once the entire message has been transferred to the S&F Transfer process 403, an S&F Delivery process 404 which serves the node at which the destination application program is situated, is informed that a new message has arrived by way of a transaction 509. The S&F Delivery process accepts responsibility for delivering the message and sends an acknowledgment transaction 510 back to the S&F Transfer process 403. If a node failure occurs before this transaction 510 is received by Transfer process 403, the Delivery Process may again be notified of a message with the "possible duplicate" flag turned on. To smooth the load on the processor which is executing the destination program and other programs, the S&F Delivery process 404 may delay action on the new message until a non-peak period of processor usage. As illustrated hereinabove in connection with FIG. 2, each node may have more than one node processor, and in the embodiment which was constructed, any one of these node processors may actually specify that no message deliveries should occur when the processor is encountering a predetermined level of activity. When a non-peak period does occur, the S&F Delivery process 404 notifies the destination program 405 that the message has arrived. Although shown in FIG. 5 as a simple transaction 511, this notification in fact takes place by way of an application control program process 406 (also shown in FIG. 3) which when notified, may actually cause the application program 405 to be executed if it is not in fact presently executing. With this information received from the application control program 406, the application program 405 prepares to read a message by invoking an sf_chk primitive.

The sf_chk primitive sends a transaction 513 to the S&F Delivery process 404 in order to request transfer parameters and buffer information on the first message waiting for this application program. When the information is returned from the S&F Delivery process 404, the sf_chk primitive returns to the application program 405. This program 405 can then examine the transfer parameters and issue an sf_read primitive to obtain the message data. The sf_read primitive transfers data from a logical message buffer into the application program's address space. Successful use of this sf_read primitive sequentially reads data from the message. The destination program 405 is not constrained to reading the message in the same number of operations as was used by the origination program when writing it. In fact the destination program may decide that it is finished with the message before reading all of it. When finished, the application program 405 issues an sf_rlse primitive.

The sf_rlse primitive sends a transaction 515 to the S&F Delivery process 404 to indicate that the message can be released and a confirmation can be generated if one was requested. It is important to note that it is the application program which is in total control of the time at which a confirmation is generated. If any user failures occur prior to the release, the S&F Delivery process 404 will renotify the application program 405 and this program can again read the message. Whenever a message is delivered for the second time, the "possible duplicate" flag is set in the message ticket to indicate that it may be a duplicate. When the release transaction 515 to the S&F Delivery process is acknowledged by a transaction 516, the sf_rlse primitive returns to the application program which may then proceed to other processing. Because the confirmation is delayed until the application program explicitly releases the message, the indication that a confirmation should be generated can in fact come from any end user with which the destination application program interacts.

A confirmation is handled exactly like a message for the purpose of transfer and delivery. The confirmation is passed to the Store and Forward Transfer process 403 that is local to the destination program 405 by way of a transaction 517, and this transfer process acknowledges receipt of the confirmation by way of a transaction 518. At this point, the transfer process 403 treats the confirmation message like any other message. The application program receiving the confirmation uses the same primitives as the destination program and gets to see all of the message ticket which includes a system level success/failure flag, an application confirmation code, and the front of the original message. The system level success/failure flag is sent when the store and forward subsystem cannot find the destination program or has failed notification of the program after a reasonable number of attempts. The application level success/failure flag is specified by the destination application program when it issues the sf_rlse primitive.

Before a more detailed explanation can be given of how a message is transmitted from one application program to another, it is helpful to discuss the software configurations of the Store and Forward Transfer and Delivery processes. As pointed out hereinabove in connection with FIG. 3, the maintenance and configuration process (MAC) activates the remainder of the control layer process including the Store and Forward Transfer and Delivery processes. These processes are executed as an embodiment of several tasks in the communications system which was constructed to practice the present invention. The term task as used herein is a single thread of execution in a process that is provided by a block of code within the process program whose context can be separately saved from the remainder of the process, for example, on its own stack, such that execution of the task can be resumed at any time from any other part of the process or from another task. Two or more tasks can operate within a process to provide quasi-parallel processing on a single processor.

In the embodiment constructed the tasks were all of the type that give up control voluntarily at certain points in their execution such as when they are waiting for some external event to occur or a system resource is currently unavailable. This voluntary approach works very well in a communication system where many of the tasks encounter pauses in their execution due to the necessity to obtain information from other processes or input/output devices, and the tasks are not of the type that require large amounts of computation. Accordingly, no special action was necessary to ensure that the tasks relinquish control. Upon the suspension of a task, certain information about the task usually called the "context" must be saved so that the execution of a task can be resumed at some time in the future. On the VAX 11/780 computer used to practice this invention, this information consists of the general registers including the program counter and a program status longword. Also since the VAX is a stack oriented machine, it is necessary to associate a stack area with each task. This was preferred to saving the stack contents upon suspension for both reasons of speed and so that addresses of data structures for a given task remain meaningful when they are passed to other tasks.

Each task is assigned a priority level and a tasking system maintains one round robin queue for each of the priority levels. When a task is suspended, it is placed at the end of the queue for its priority. When the operating tasking system looks for a new task to execute, it chooses the first task in the non-empty queue with the highest priority. In this way, some measure of control over how soon a task is executed after it is scheduled for execution is maintained.

The synchronization between tasks is obtained through several methods. The first and simplest method is a sleep/wake method wherein a task goes to sleep until the task is requested to wake up by some other task. Another method of task synchronization used in the present embodiment is the semaphore. Briefly, the semaphore is a data structure which contains a non-negative integer counter. One way in which the semaphore is used is if a task attempts to use an external resource, it decreases the semaphore by one. If the counter is greater than 0 then the operation is successful. If the counter is 0, then the task waits until it finds that the counter is greater than 0 and decrements it then. After using the resource, the task increases the value of the semaphore. The final method of communication is through the use of events. In the embodiment constructed the asynchronous software trap available in the VAX 11/780 operating system is used to receive notification of events from outside the task and to transmit this notification to the task.

Figure 6:
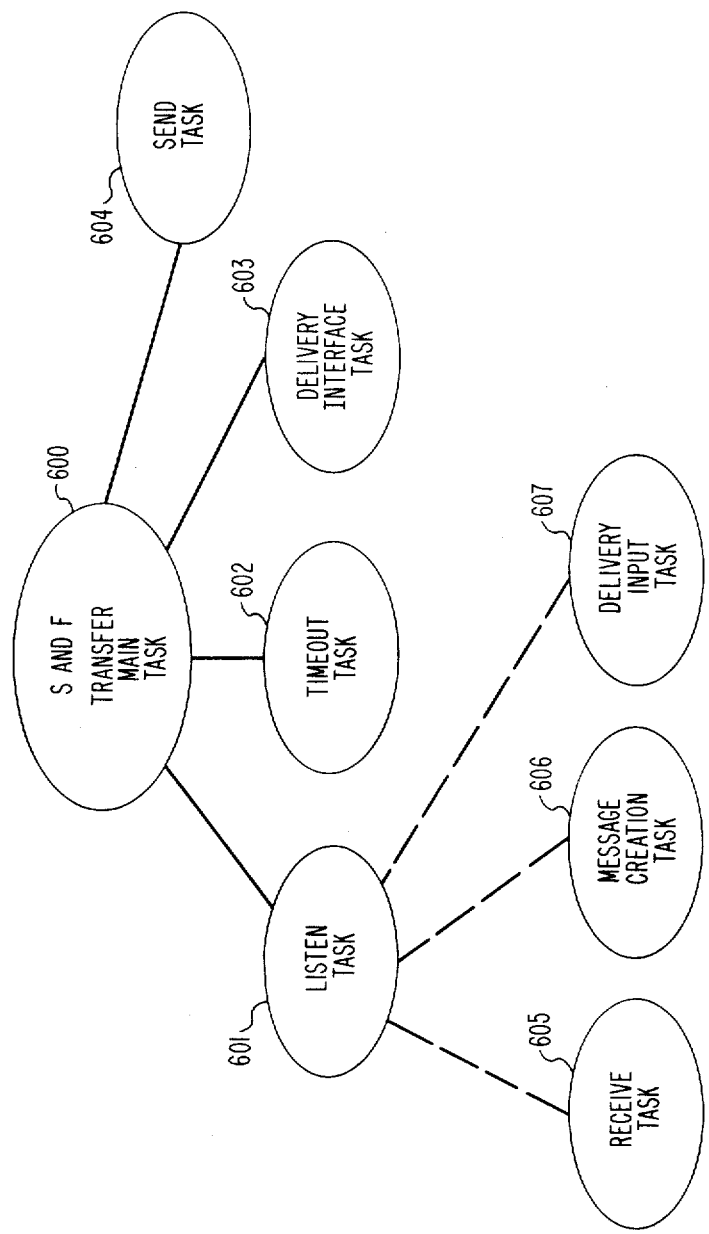
FIG. 6 is an outline diagram of the store and forward transfer main task and its various permanent and temporary tasks.

When the main task of the Store and Forward Transfer process is created by the maintenance and configuration process, the first step of this task, shown as 1601 in FIG. 16, is to initialize several run time parameters and data structures and to open the necessary files. Among the run time parameters that are set during initialization are the total number of messages that the S&F Transfer Process may handle, and the name, size and threshold of the S&F Transfer Process control file. The network standard address (NSA) for the Store and Forward Transfer process, the MAC process and the local Store and Forward Delivery process are established. After initialization, the main task of Store and Forward Transfer proceeds to step 1602 during which it creates several permanent tasks to be described in detail hereinafter. The permanent tasks created are illustrated in FIG. 6 and are listed therein as the Listen Task 601, the Timeout Task 602, and the Delivery Interface Task 603. The Send Task 604 is also a permanent task but it is created only when there is a message for a remote node. These tasks are permanent in the sense that they will continue to exist as long as the processor in which they are running encounters no failures and is not purposely deactivated. As illustrated in FIG. 6, the Listen Task 601 can in turn create several temporary tasks, entitled the Receive Task 605, the Message Creation Task 606, and the Delivery Input Task 607.

Figure 7:
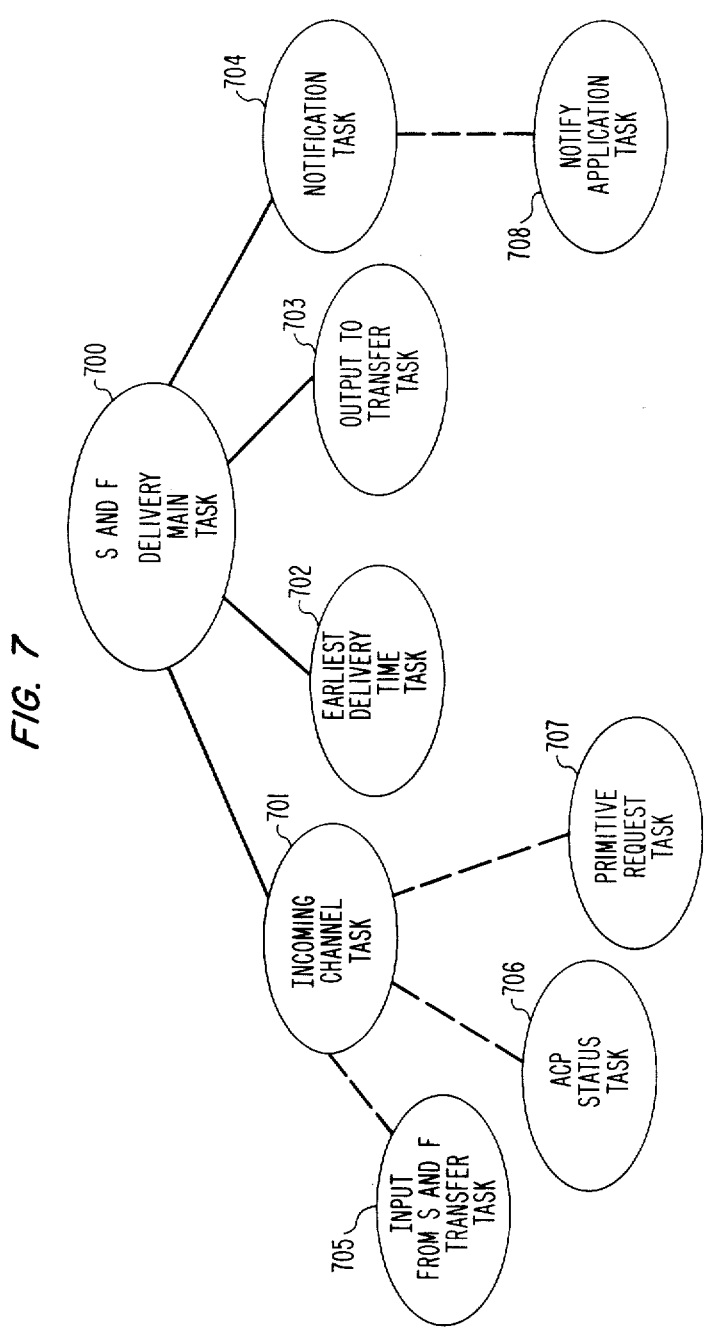
FIG. 7 is an outline diagram of the store and forward delivery main task and its various permanent and temporary tasks.
Figure 24:
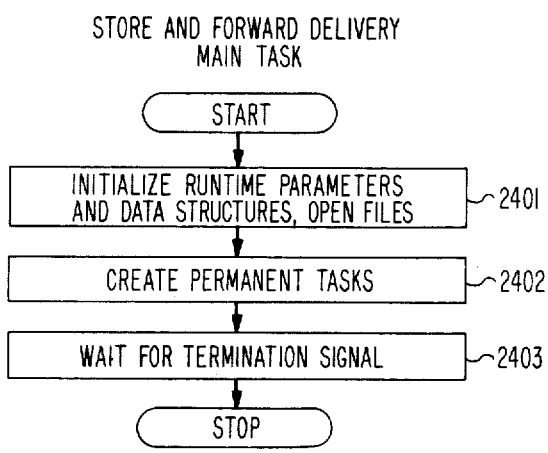
FIGS. 24 through 32 are flowcharts of the tasks associated with the store and forward delivery process.

In a similar fashion, the Store and Forward Delivery process is created by the maintenance and configuration process. The delivery process also includes an initialization step 2401 shown in FIG. 24 as the first step in its main task. Here again, run time parameters and data structures are initialized and the necessary files are opened. The run time parameters include the NSA of the local Store and Forward Transfer process, and the name, size and threshold of the Store and Forward Delivery control file. Following the initialization step 2401 the main task of the delivery process proceeds to step 2402 during which it creates several permanent tasks. These permanent tasks are illustrated in FIG. 7 and are entitled the Incoming Channel Task 701, the Earliest Delivery Time Task 702, the Output to Transfer Task 703 and the Notification Task 704. As indicated in FIG. 7, the Incoming Channel Task can, in turn, create several temporary tasks, shown as the Input from S&F Transfer Task 705, the ACP Status Task 706 and the Primitive Request Task 707. Similarly, the Notification Task 704 can also create temporary tasks entitled Notify Application Task 708. All of these permanent and temporary tasks will be more understandable after reading the following description in which a message is followed from its creation in an origination program to its final use in a destination program.

As previously described, the store and forward primitive, sf_open, is invoked by an application program such as 401 in FIG. 4 which intends to originate a message using the S&F facility. Upon being invoked, the sf_open primitive advances to step 800 in FIG. 8 where it obtains the structured data including the destination Network Standard Address (NSA) and may optionally also include such parameters as the service grade desired and other requirements such as confirmation and earliest delivery time. The primitive then advances to step 801 where it checks the destination NSAs against a network routing table to establish the validity of the addresses. Assuming that these addresses are valid, the primitive advances to decision step 802 where a determination is made as to whether this is the only store and forward message being sent by this process or, alternatively, whether other messages are being sent by this process. Assuming that this is the initial message, decision step 802 advances the primitive to step 803 to generate a connection to the S&F Transfer process 402. The primitive continues after the connection is established as indicated in step 809 to step 804. Alternatively, if there was a prior store and forward message from this process, the connection to S&F Transfer process 402 was therefore already established and decision step 802 advances the primitive directly to step 804.

In step 804, a unique network-wide message tag is generated for this store and forward message. The message tag structure is shown in FIG. 15. As indicated, this tag will include the sender's NSA and other information to uniquely identify this store and forward message. The primitive thereupon advances to step 805 and, in step 805, exchanges an open transaction with the S&F Transfer process as indicated in FIG. 4. As described hereinafter, S&F Transfer 401 assigns a task for the message and returns a message identifier back to the sf_open primitive as indicated in step 806.

In the next step 807, a store and forward ticket is formatted with control information which will accompany the message. The ticket information is listed in FIG. 14. In addition to the message tag, the ticket includes items such as grade of service, earliest delivery time, the network addresses for the sender, destination(s) and confirmation, if required. The sf_open primitive then advances to step 808 where the message tag and the message ID are sent back to the invoking process, and finally to step 810 where it returns.

At this point, the origination process 401 proceeds to create the message text. When message text information is obtained and buffered, process 401 invokes the sf_write primitive, providing to the primitive the message ID and the identity of the buffer containing the message data as depicted in step 910 of FIG. 9. The primitive thereupon advances to step 911 and copies the data into a buffer internal to the primitive. The primitive then advances to decision step 912 wherein a determination is made as to whether all user data has been copied. In the event all user data has not been copied, decision 912 advances the primitive to step 913. In step 913, an information unit (of data) is obtained from the internal buffer (this IU also contains the message ID) and is forwarded to the Store and Forward Transfer process 402. When an acknowledgment is received from Store and Forward Transfer process 402 in step 914, the primitive loops back to processing step 911. Alternatively, if all user data has been copied, the primitive advances to step 915 where it returns to the calling process.

Assume now that origination process 401 has completed creating the message text. Process 401, at this point, invokes the sf_close which in its first step 1016 of FIG. 10 sends the remaining user data from the internal buffer to the S&F Transfer process 402. The remaining user data arises from the fact that all of the data will not have been sent by the looping process (912, 913 and 914) provided by the sf_write primitive. At this time, the sf_close primitive waits for an acknowledgment of receipt in step 1017 before advancing to decision step 1018.

In decision step 1018, it is determined whether other messages are being sent by way of the same connection (channel) to the Store and Forward Transfer process 402. In the event there are other messages being sent, the channel set up to communicate with the Store and Forward Transfer process 402 is maintained, as depicted in step 1019 and the primitive advances to step 1021 where it exits and returns to the calling process. Alternatively, if no further messages are in progress to the Store and Forward Transfer process 402, decision 1018 advances the primitive to step 1020 where the connection to the Store and Forward Transfer process 402 is terminated. The sf_close primitive then advances to step 1021 which causes a return to the calling process.

Figure 20:
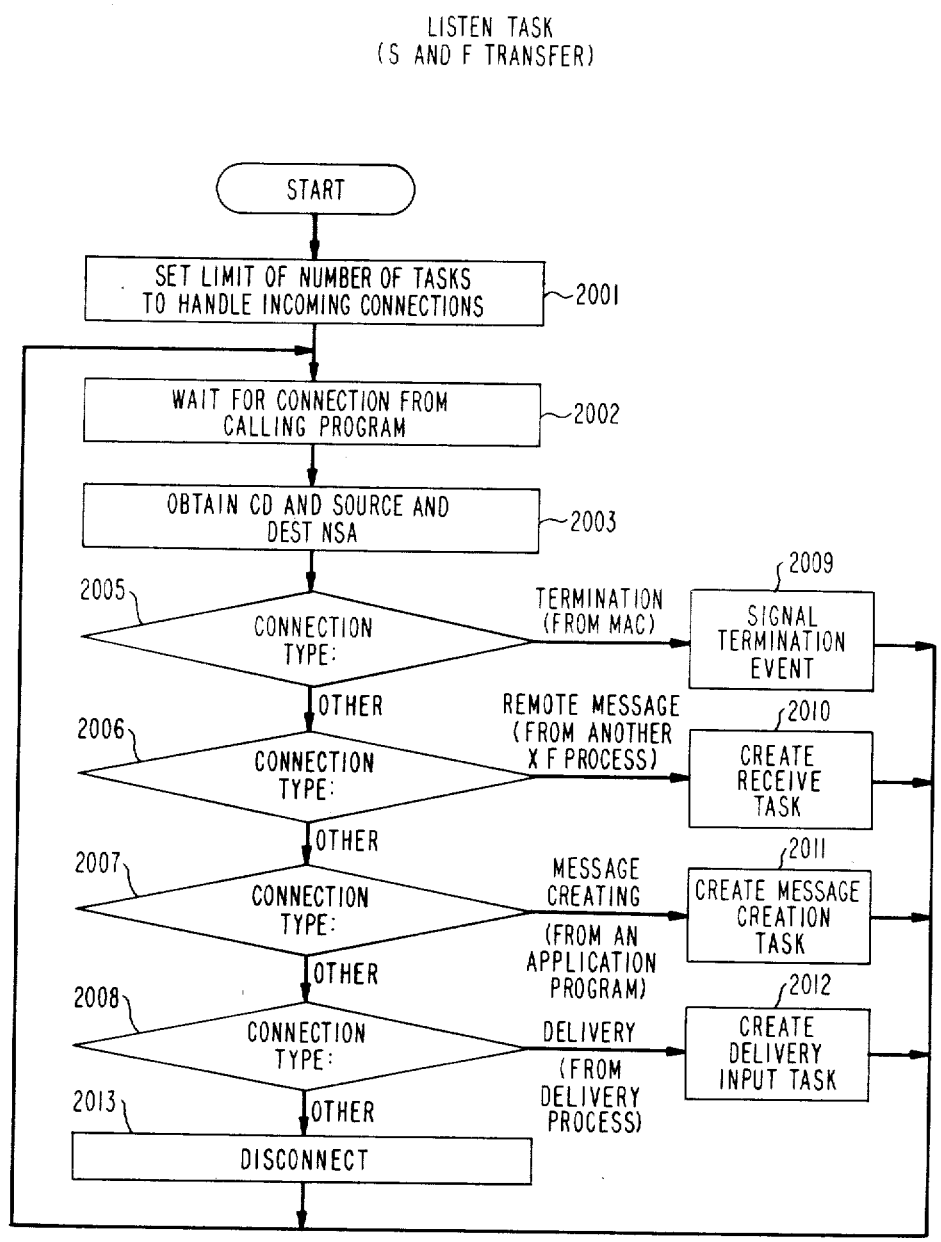

As described above, the sf_open primitive initially forms a connection to the Store and Forward Transfer process 402. In the Store and Forward Transfer process 402, the transaction is received by the Listen task 601. The flowchart for the Listen task is set forth in FIG. 20.

Figure 21:
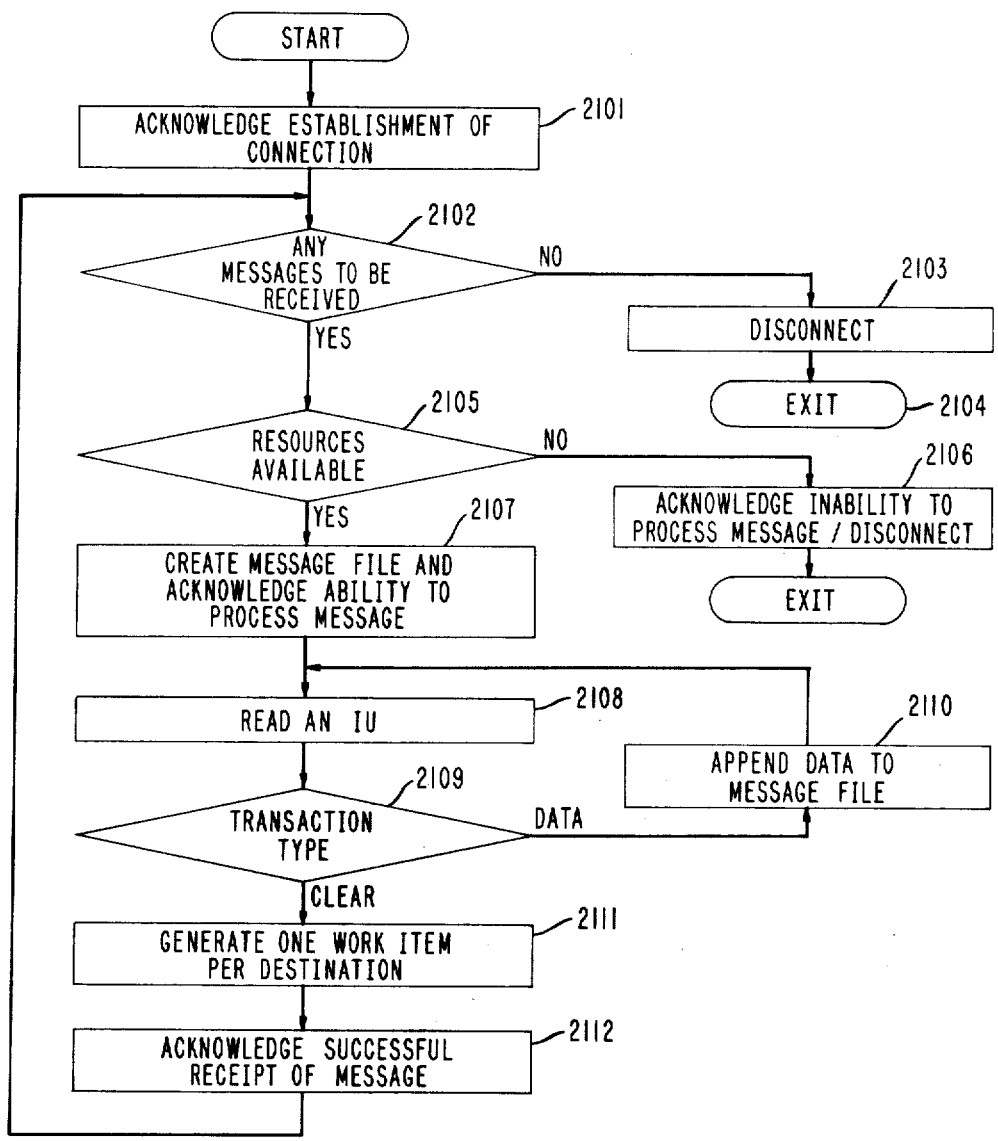

When the Listen Task is initialized, it sets in step 2001 a limit for the number of tasks to handle incoming connections to the Store and Forward Transfer process. The Listen task then waits for a connection from a calling program in step 2002 which connection may be received from various processes, as noted below. Upon the reception of the connection, the Listen Task advances to step 2003 where it obtains the circuit descriptor (CD) and the source and destination NSA of this connection. Several decision steps (2005-2008) then follow which cause the Listen Task to proceed along different paths depending on the type of connection that has been established. If the node is being shut down and the connection is from the MAC process of FIG. 3, a termination event is signaled in step 2009. If the connection is from a remote S&F Transfer process, a Receive Task of the type shown as 605 in FIG. 6 (and discussed hereinbelow in connection with FIG. 21) is generated in step 2010. If the connection is from an application program, a Message Creation task of the type shown as 606 in FIG. 6 (and discussed hereinbelow in connection with FIG. 22) is generated in step 2011. Finally if the connection is from the S&F Delivery Process, a Delivery Input Task of the type shown as 607 in FIG. 6 (and discussed hereinbelow in connection with FIG. 23) is generated in step 2012. If the connection is not from any of these valid sources, a disconnect of the channel is performed in step 2013 and the Listen Task returns to step 2002 to wait for the next connection from a calling program.

In accordance with our present scenario, the connection is from an application program 401. Accordingly, a Message Creation Task is created. Upon the creation of this Message Creation Task, the Listen Task is advanced back to step 2002 where it awaits the next connect request from a calling program.

Figure 22:
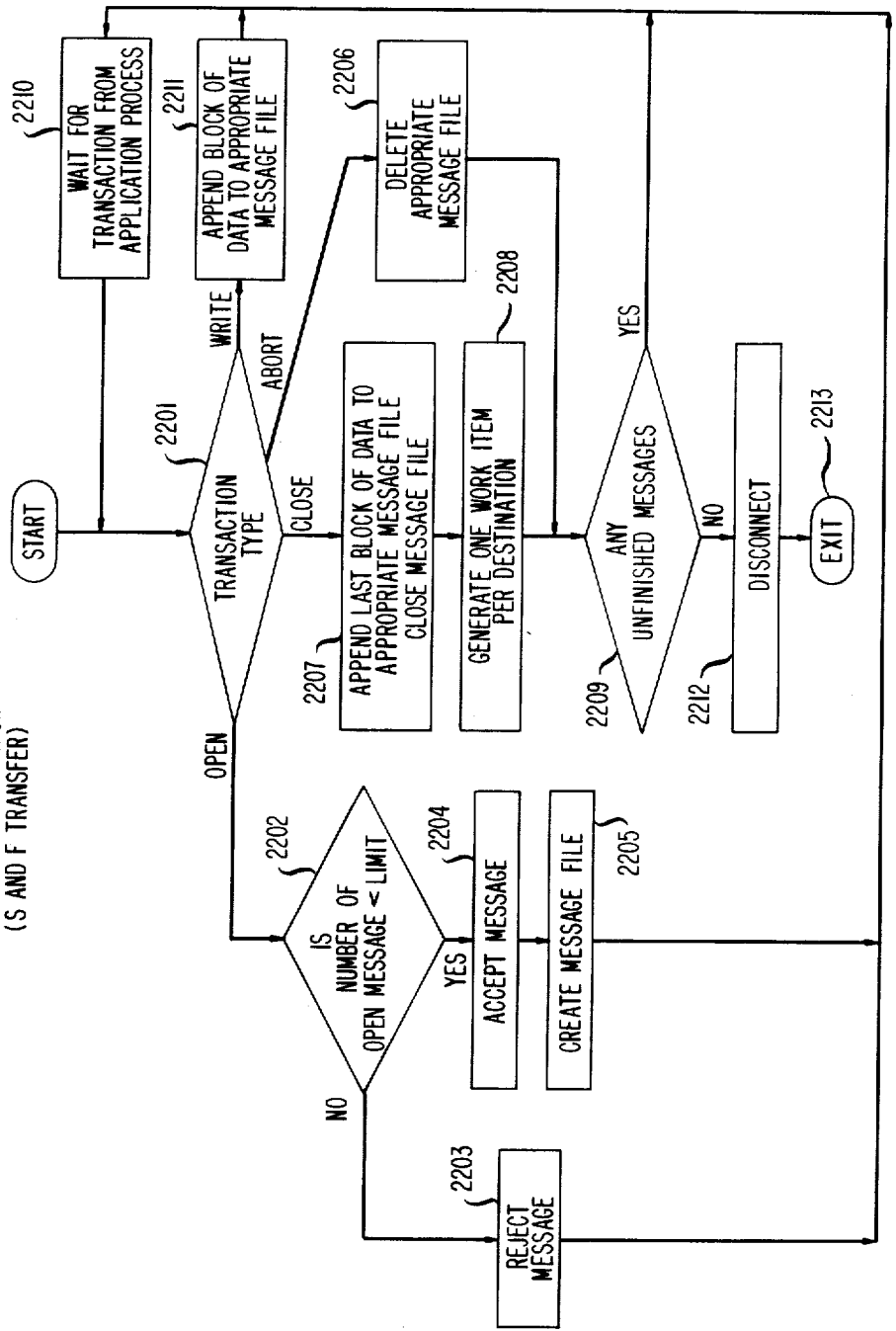

The Message Creation Task, upon being created, advances to a decision step 2201 shown in FIG. 22. In decision step 2201, the transaction type is determined and assuming, as in this case, that this transaction type constitutes an "open" message command, the Message Creation Task advances to decision step 2202. In decision step 2202, a determination is made as to whether the number of "open" messages is less than a preset limit. Assuming the number of "open" messages has reached or exceeded this limit, the task advances to step 2203. In step 2203, a reject message is created and returned by way of the formed connection back to the application program, advising the program that the store and forward message has not been accepted. The Message Creation task thereupon advances to step 2210 described below.

Assume now that the number of "open" messages does not exceed a limit and all necessary resources are available to accept the message. In that event, decision 2202 advances the task to step 2204. In step 2204, an "accept" transaction is created and sent back by way of the connection to the application process. The task then advances to step 2205 wherein a message file is created. Upon the creation of the message file, the task advances to step 2210. In step 2210, the task awaits the next transaction from the application process.

In accordance with our scenario, the next transaction from the application program is a "write" transaction which includes an information unit containing the message ID and a first block of message data. This transaction, when received by the Message Creation task, advances the task back to decision step 2201. Since this is a write command, decision step 2201 advances the task to step 2211. In step 2211, this block of data (received from the sf_write primitive of the application process) is placed in the appropriate message file, that is, the one created in step 2205, and the task thereupon returns to step 2210 awaiting the next block of data. If there were a number of open messages, the data is appended to the file for which it is intended using the message ID supplied in the "write" transaction. When the next block of data is received, the task advances to decision step 2201, this next block of data is appended to the prior block in step 2211 and this looping continues until a "close" transaction is received from the sf_close primitive of the application process.

When the "close" transaction is received from the sf_close primitive, decision step 2201 of the Message Creation task advances the task to step 2207. In step 2207, this last block of data as described in step 1016 is appended in the message file created in step 2205 and the message file is closed. The task then advances to step 2208 where a work item for each destination of the store and forward message is generated. The work item includes the NSA of the destination process and a pointer to message related data which in turn includes message parameters and the identity of the message file. The work item is then placed on a queue which is selected in accordance with the node serving the destination process. The task then advances to decision 2209 where a determination is made as to whether there are any other unfinished messages that are being or are to be received from the same application program. If there are further messages, the task advances back to step 2210 to await the next transaction. Alternatively, if there are no further messages, the task advances to step 2210 to terminate the connection with the application program and thereafter advance to step 2213 to terminate the task.

In the event that the application program decides that it no longer wishes to send the message it had started, an appropriate "abort" command is received by the Message Creation Task to advance the task from step 2210 to decision step 2201. Upon recognition of the abort command, decision step 2201 advances the Message Creation Task to step 2206. In accordance with step 2206, any previously stored information in the message file is deleted and the allocated resources are returned to the common stores. The task then advances to decision step 2209 to proceed as described above.

Assume now that one or more of the destinations for the store and forward message is in the same node as the originating application process. In this event, the work item or items have been placed on a queue serving the local node. When a work item (for the local destination) appears at the queue output, the Delivery Interface Task 603 which is one of the permanent tasks of the S&F Transfer process is signaled. It is presumed here that this is the first message destined for a local process. Accordingly, the delivery interface task begins in step 1701 where it was waiting for a work item from the transfer work queue and advances to step 1702 where a connection is established with Store and Forward Delivery process 404. The Delivery Interface task then advances to step 1703 where all work items for local delivery for the same message are collected. The task then advances to step 1704 to send a transaction to the Store and Forward Delivery process containing all the local destinations (NSAs) and the name of the message file created by the Message Creation Task. The Delivery Interface Task then advances to step 1705 to await an acknowledgement from the Store and Forward Delivery process and, when the acknowledgement is received, the task advances to step 1706 where the work item or items are removed from the queue. Thereafter, the task advances to step 1707 where it again waits for another work item from the queue and, when the next work item is obtained, the task loops back to step 1703 described above. It should be noted that, after initial creation, the connection to the local Store and Forward Delivery process is permanently maintained and that a new connection need not be created with the Store and Forward Delivery process for the subsequent work items for messages which will be locally delivered unless a failure in the communication mechanism occurs.

Assume now that a store and forward message is destined to a remote location, that is, to one or more destination processes served by a remote node. In this event, the Message Creation Task places the work item or items in step 2208 of FIG. 22 on a queue associated with that remote node. The Store and Forward Transfer process creates one Send Task 604 for each remote node, and the Send Task associated with the remote node serving the destination process or processes scans the queue in step 1801 in FIG. 18, waiting for the work item for the message destined for the remote node.

Figure 19:
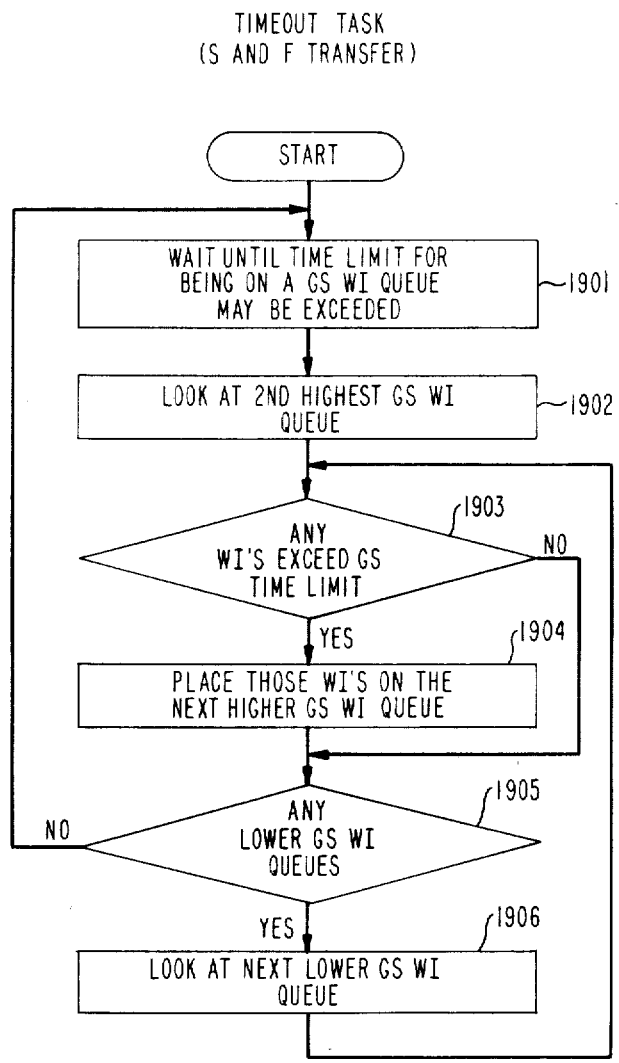

Each of the work item queues, including the one associated with the local delivery process, has a different level for each grade of service. The Time Out task 602 insures that even the lower grades of service will receive reasonable attention. Specifically, the Time Out task moves a work item to a queue corresponding to a higher grade of service in the event that the work item is not processed within a predetermined time limit. The steps used by the Time Out task to accomplish this result are illustrated in FIG. 19. The task normally waits in step 1901 for some predetermined interval until a check of the work items is believed to be warranted. After the predetermined interval, the task proceeds to step 1902 where it looks at the work item queue corresponding to the second highest grade of service and then determines in decision step 1903 whether any work items at that level have exceeded the predetermined time limit. If they have, the task proceeds to step 1904 where it takes those work items that have exceeded the time limit and places them on the queue corresponding to the next higher grade of service. Alternately, if the work items do not exceed the time limit, step 1904 is bypassed and the task proceeds directly into step 1905 where a determination is made as to whether there are any work item queues corresponding to a lower grade of service. If there are not, the task proceeds from decision step 1905 back to step 1901 where the task again waits for the predetermined interval. If, however, there are work item queues with lower grades of service, the task proceeds from step 1905 into step 1906 where the work items in the queue corresponding to the next lower grade of service are checked. The task then proceeds back to decision step 1903 where a determination is made as to whether any of the work items in this queue corresponding to the next lower grade of service have exceeded the predetermined time limit. In this way, reasonable service is insured for all levels of service since even a work item on the lowest grade of service can be ultimately moved to the highest grade of service if it continues to exceed the predetermined time limit.

When the work item or items appear at the output of the queue, the Send task advances from step 1801 to step 1802. In step 1802, the destination NSA in the work item is used to determine the destination transfer process and a connection is established from the local node by way of the transport network to the remote node. The Send Task then advances to step 1803 to await the connection acknowledgement from the remote end. When this acknowledgement is received, the task advances to step 1804.

In step 1804, a message available command is generated and the command is issued as a transaction for transmission to the remote Store and Forward Transfer process. At the same time, all of the work items for this message which are destined to this remote Store and Forward Transfer process are collected. The task then advances to decision step 1805 where it is determined whether an appropriate acknowledgement is received. If the transaction has not been accepted from the remote Store and Forward Transfer process and if an appropriate acknowledgement has not been received indicating that resources to process the message are available (at the destination S&F Transfer Process), the connection is removed, and after an appropriate time delay as depicted by step 1806, the Send Task loops back to step 1801 to again obtain from the queue the work item or items of messages destined to the remote Store and Forward Transfer process.

Assume now that the transaction is accepted by the remote Store and Forward Transfer process. In this event an appropriate acknowledgement is received and decision step 1805 advances the Send Task to step 1807. In step 1807, the blocks of data in the message file are obtained, bundled into information units, and written into the connection to the remote Store and Forward Transfer process. In this manner, the blocks of message data are sent to the remote process until the data in the message file is exhausted. The Send Task thereupon advances to step 1808 where the end-of-message command is generated and written into the connection. In step 1809, the Send Task awaits the acknowledgement from the remote Store and Forward Transfer process and, if an acknowledgement is not received, the Send task after an appropriate time delay indicated by step 1810 returns to step 1801 to await for a work item to be sent to a remote node. In this case, the message is sent once again, with the "possible duplicate" flag set, since a failure had occurred. If an acknowledgement is received, the task advances to step 1811 to remove the work item or items from the queue.

In decision step 1812, a determination is made as to whether the work on the message file has been completed. For example, this single message may be destined to recipients in several other nodes and, if the processing of this message has not been completed, decision step 1812 will advance the task to decision step 1814. Alternatively, if the work on the message file is complete, decision step 1812 advances the task to step 1813 where the message file is deleted and, upon such deletion, the task also advances to decision 1814.

In decision step 1814, a determination is made as to whether other messages are to be transferred to this same remote Store and Forward Transfer process. If other messages are to be so transferred, the Send Task advances back to step 1804 and a new message available command is generated and sent to the remote process and the above-described sequence is repeated. Alternatively, if no further messages are destined for the remote Store and Forward Transfer process, corresponding to this Send Task, the Send Task advances to step 1815 to terminate the connection with the remote S&F Transfer process. The Send Task then loops back to step 1801 to wait for new items on the queue.

Assume now that a Send Task in a Store and Forward Transfer process located in one node has established a connection with a Store and Forward Transfer process located at a remote or destination node, in the manner described above. At the destination node, the Listen Task of the Store and Forward Transfer process 403, in response to the request for the connection, has advanced to step 2003 and obtained the circuit descriptor and the source and destination NSAs in the same manner as previously described. The connection type from the Send Task in the orginating Store and Forward Transfer process advances the Listen Task in the Remote Store and Forward Transfer process through decision step 2006 to step 2010 where a Receive task 605 is created. The Listen Task then advances back to step 2002 to await a next connection request.

The Receive Task 605 upon creation advances to step 2101 where an acknowledgement to the connection attempt is generated and is sent back to the Send Task in the originating Store and Forward Transfer process 402. The Receive Task then advances to decision step 2102 where a determination is made as to whether a message is to be received. Since in this present scenario the Send Task sends a "message available" transaction designating the desire to transfer a message, decision 2102 advances the Receive Task to decision step 2105. In decision step 2105, a determination is made as to whether resources for processing the message are available. If there are inadequate resources, decision step 2105 advances the Receive Task to step 2106 where an appropriate response (indicating insufficient resources) is generated and returned to the Send Task in the originating Store and Forward Transfer process and thereafter the Receive Task disconnects the connection in the previously described manner and the task expires.

Assume now that adequate resources are available. In this event, decision step 2105 advances the Receive Task to step 2107 where a message file is created and an acknowledgement is generated indicating the task's ability to process the message. This acknowledgement is then returned through the connection back to the originating Store and Forward Transfer process. At the originating process the Send Task now proceeds to send the information units as described earlier. The Receive Task in step 2108 reads the incoming information unit and advances to step 2109. If the information unit constitutes data, the Receive Task advances to step 2110 to append the data to the message file. The task then loops back to step 2108 in order to read the next incoming information unit. In this manner the various information units are assembled in the message file until the final information unit is received and the Send Task in the originating process sends the end of message command. When this command is received, decision step 2109 advances the Receive Task to step 2111. In step 2111, the Receive Task generates a work item for each destination process, placing the work item on the Delivery Interface Task queue. An acknowledgement is then generated in step 2112 and returned to the originating process. At this point, thee Receive Task loops back to decision 1381 to determine if another message is to be received. Assuming now that there are no further messages, decision step 2102 advances the Receive Task to step 2103 where the connection to the origination S&F Transfer process is terminated. The Receive Task thereupon retires.

Figure 28:
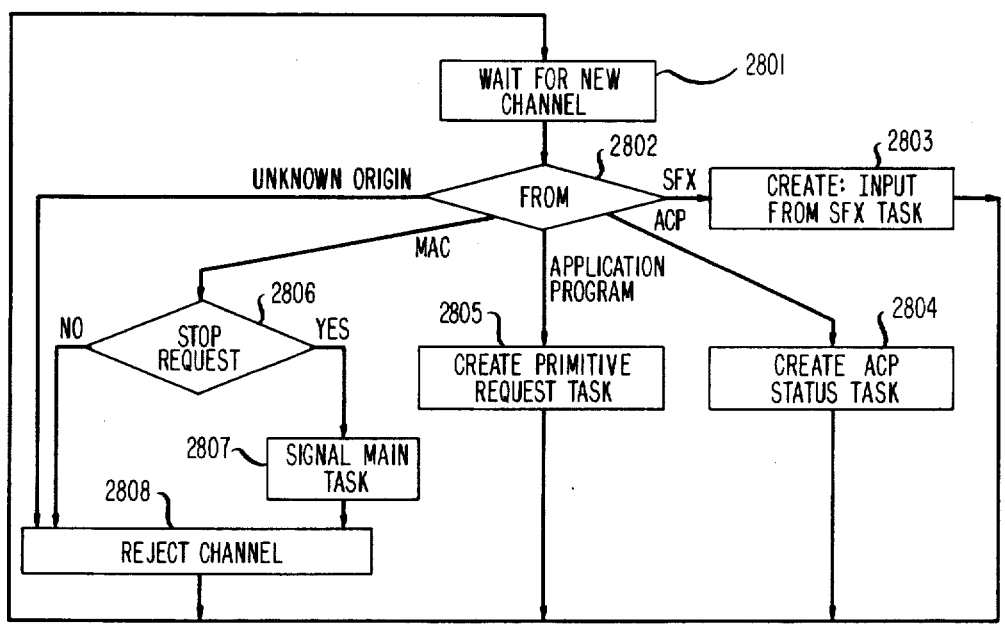

Incoming connection requests to Store and Forward Delivery process 404 are monitored by the Incoming Channel Task 701 of the Delivery process as depicted in step 2801 of FIG. 28. When a new channel request is received, the Incoming Channel Task advances to decision step 2802 to determine (from the received transaction) the origin of the connection request. If the origin of the connection request is unknown, that is, if it is not from the Store and Forward Transfer process 403 or from an application program 405 or from the application control program (ACP) 406 or from the MAC process, decision step 2802 advances the task to step 2808. In step 2808, the connection is rejected and the task returns to step 2801.

Assume now that the incoming connection is the above-described request from the Store and Forward Transfer process 403 to transfer the first message to this Store and Forward Delivery process 404. In this event, decision step 2802 advances the Incoming Channel Task to step 2803 wherein the S&F Transfer Input Task 705 is created, and the Incoming Channel Task again loops back to step 2801 to wait for a new channel request. Of course, as previously noted, after the first message request is received from the Store and Forward Transfer process, the connection therebetween is permanently assigned and the SFX Input Task consequently permanently exists after the first message.

Figure 29:
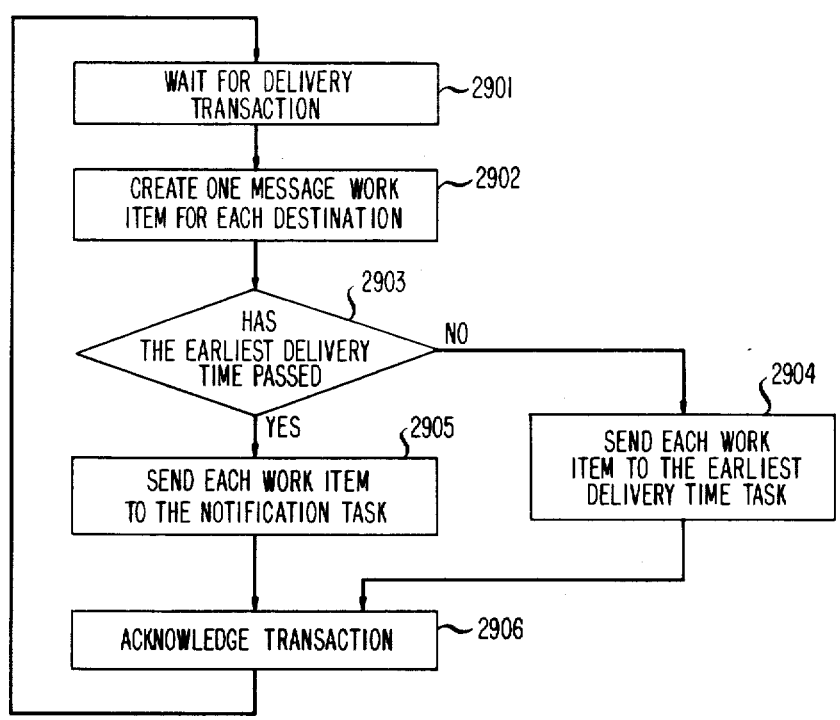

Initially, the S&F Transfer (SFX) Input Task 705 waits for the receipt of each "delivery" transaction from the Store and Forward Transfer process as indicated in step 2901 of FIG. 29. Upon the receipt of the transaction (which contains the local file name and the destination NSAs) from the Store and Forward Transfer process the task advanced to step 2902.

In step 2902, a "work item" is created for each NSA destination of the message. This work item will consist of structured data comprising, in part, certain parameters for the message such as the length of the message and the earliest delivery time to the destination as defined in the message header (which parameters are shown in FIG. 14 and are hereinafter called the "message ticket"), the message file name previously generated by the local Store and Forward Transfer process and the destination NSA. The task then advances to decision step 2903 which notes the earliest delivery time and determines whether this delivery time has passed. If the delivery time has passed, the task advances to step 2905, and the Notification Task 704 is signaled and the work item is sent to this task. After signaling this event to the Notification Task, the SFX Input Task proceeds to step 2906.

Alternatively, in the event that the earliest delivery time has not passed, decision step 2903 advances the SFX Input Task to step 2904, wherein the Earliest Delivery Time Task 702 is signaled and the work item is sent to this task. After this signaling, the SFX Input Task advances to step 2906.

In step 2906, an acknowledgement is generated and passed back to the Store and Forward Transfer process. The task then goes back to step 2901.

Figure 25:
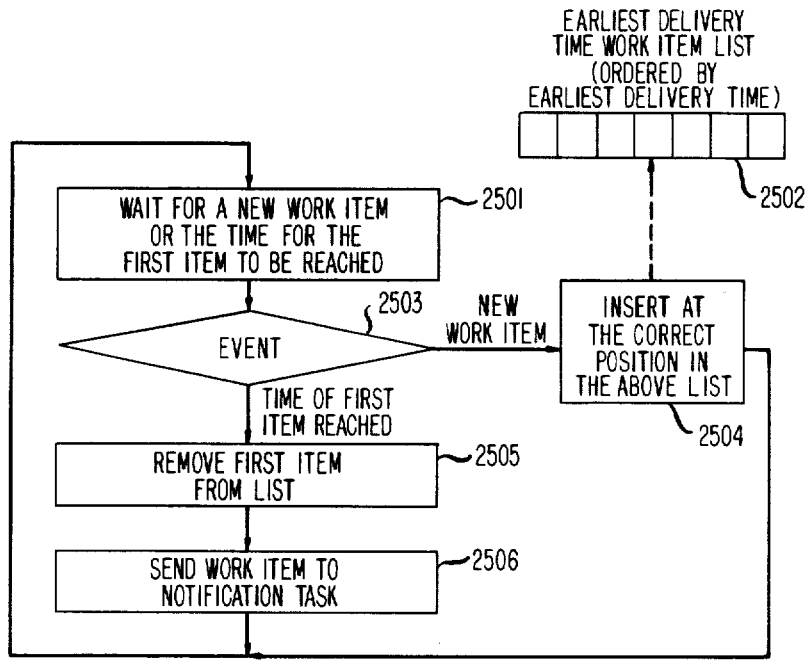

Assume now that the SFX Input Task has signaled the Earliest Delivery Time Task 702. The Earliest Delivery Time Task is awaiting, in step 2501 of FIG. 25, either for a new work item of the type provided to it from the SFX Input Task or for the time of the first item on data structure 2502 to be reached. The entire purpose of the Earliest Delivery Time Task is to manage data structure 2502 which is a list of the work items ordered by earliest delivery time. The signal from the SFX Input Task described hereinabove advances the Earliest Delivery Time Task to decision step 2503. Decision step 2503 determines whether a new work item has been delivered or whether delivery time for a work item in the list has been achieved. At this time in our scenario, a new work item has been delivered and decision step 2503 advances the task to step 2504. In step 2504, the work item is inserted in data structure 2502 which is sorted to place each item in the structure in accordance with earliest delivery time, earlier delivery times being placed ahead of later delivery times. After this insertion, the task advances back to the wait state which constitutes step 2501.

Assume now that the time of delivery for a work item is reached. It is presumed that this item is at the head of the queue and when the delivery time has been reached, the task advances to decision step 2503. Decision step 2503, upon determining that the delivery time of this item has been reached, then advances this task to step 2505 where this first item in the queue is removed. In the next step 2506, the Notification Task is signaled and the work item is sent to the Notification Task. The Earliest Delivery Time Task then goes back to the wait state identified as step 2501.

Figure 26:
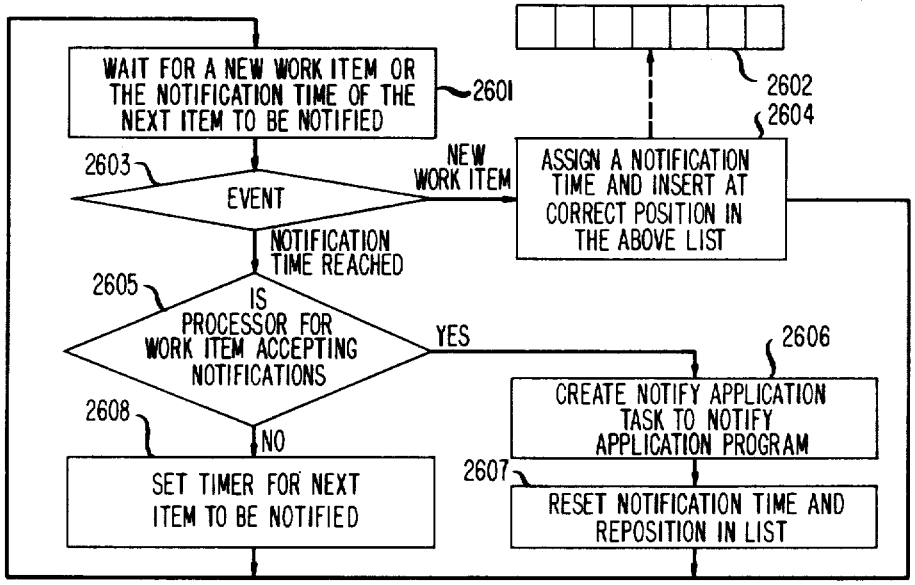

As previously described, the Notification Task 704 is signaled either by the SFX Input Task or the Earliest Delivery Time Task when the work item indicates that the time for delivery has been reached. The Notification Task is initially in the wait state depicted as step 2601 in FIG. 26 where the task is waiting either for a new work item or for the next item to be notified on a data structure 2602 which is a work item list ordered by the next notification retry time. The signalling of this task either by the SFX Input Task or by the Earliest Delivery Time Task advances the task to decision step 2603. Decision step 2603 determines whether this is a new work item or an item in the list of 2602 which has reached retry time. Since in this portion of the scenario this is in fact a new work item, the task advances to step 2604. In step 2604, a notification time is assigned to the work item, which in the case of new work items, constitutes the present time. The work item is then placed in a queue of data structure 2602 which is sorted in accordance with the next notification time. The task then loops back to step 2601 awaiting the next event.

Figure 30:
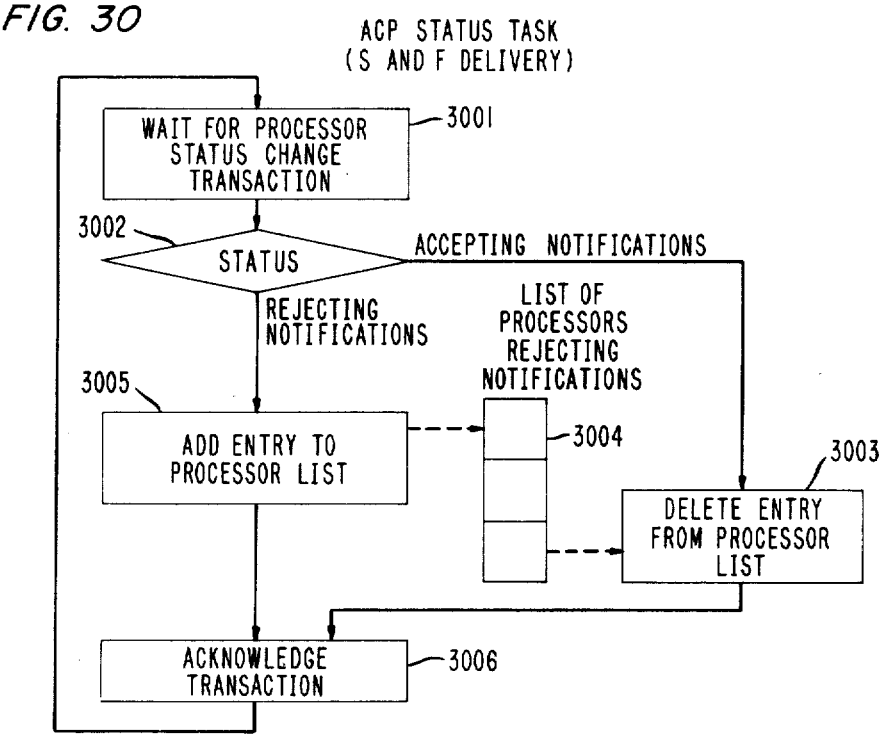

In accordance with our scenario at least one work item in the queue contains a notification time corresponding to the present time and a signal event occurs and the Notification Task in step 2601 advances the task to decision step 2603. In decision step 2603, a determination is made that a notification time has been reached, and this determination advances the task to decision step 2605 wherein a determination is made as to whether the destination processor (for this work item) is allowing "notification", that is, accepting incoming store and forward calls. This determination is made by checking the list of processors rejecting notifications (3004 in FIG. 30) which list is managed by the ACP Status Task 706 whose flowchart is discussed hereinafter in connection with FIG. 30. If the processor is not accepting incoming calls at this time, the Notification Task advances to step 2608 which sets the timer for the next item, in structure 2602, to be notified and then advances back to the wait state of step 2601. Assuming, however, that the destination processor is accepting notifications, decision step 2605 advances the task to step 2606. This creates a Notify Application Task 708 mentioned hereinafter. The Notification Task then advances to step 2607 to reset the notification time and reposition the work item in the queue. The task then returns to step 2601 to wait as previously described.

It should be noted that the work item is kept on the list provided by data structure 2602 even when a Notify Application Task has been created. As will be apparent hereinafter, it is the destination application process which is in control of removing the work item from the list. Until this process checks on its messages, the Store and Forward system will continue periodically to create Notify Application Tasks to carry out the job of delivering the message.

When the Notify Application Task 708 is created by the Notification Task 704 in step 2606, the Notify Application Task is advanced to step 3201. In step 3201, the Notify Application Task obtains the destination process NSA from the work item created in step 2902 of the SFX Input Task. The Notify Application Task then generates a connection in step 3202 to the destination application process by way of the ACP process since all calls to application processes are initially routed to the ACP process. Accordingly, at this time, the ACP process creates the application process (assuming that the process is not running) and the destination application process is thereby initialized and the cell is redirected to such process.

Figure 33:
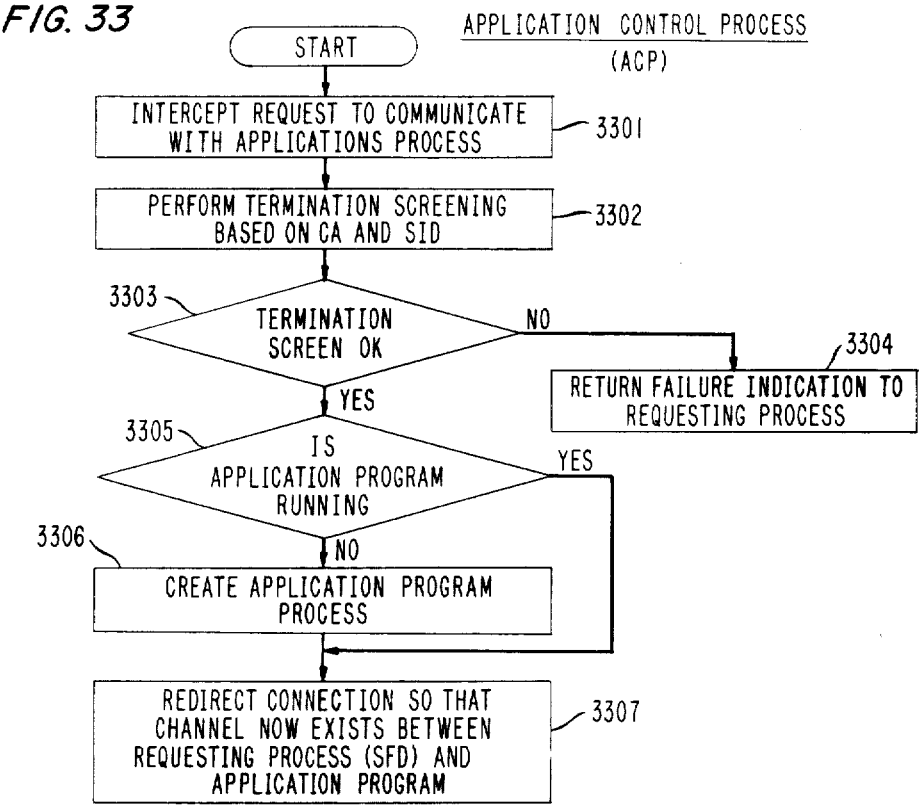
FIG. 33 is a flowchart of that part of the application control process which will create the destination program if necessary.

As indicated in FIG. 33 wherein a flowchart of the ACP process is presented, the ACP intercepts all requests to communicate with an applications process in step 3301. The ACP process then proceeds to step 3302 where it performs a termination screening of the message to determine whether the destination is permitting communication from the origination. If the screening does not pass in decision step 3303, a failure indication is returned to the requesting process in step 3304. If screening does pass, determination is made in decision step 3305 as to whether or not the destination application program is running. If it is not, the application program process is created in step 3306. In either case, the connection from the S&F Delivery process is finally redirected so that a channel is established between S&F Delivery and the destination application program.

Figure 32:
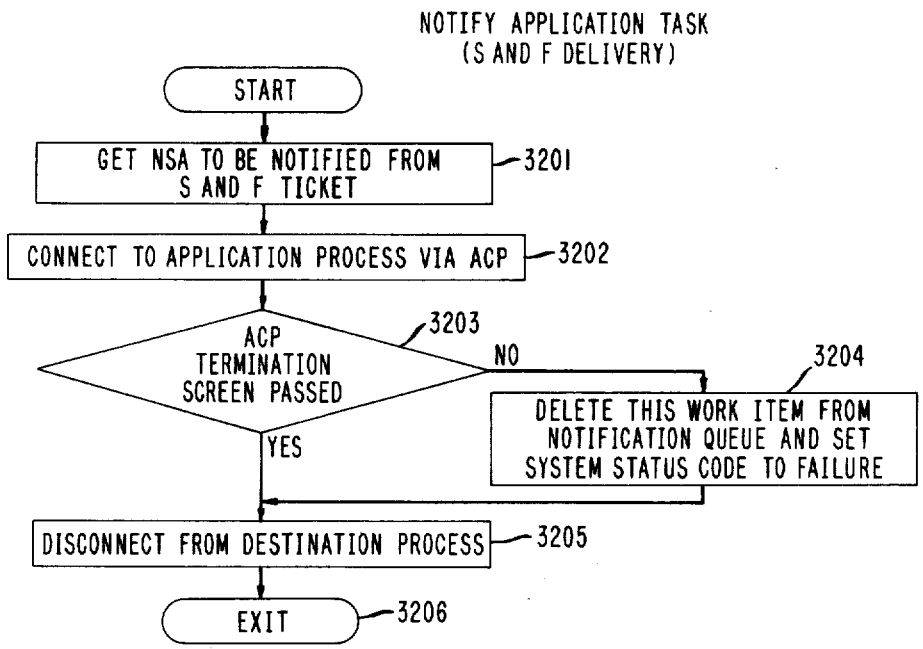

With the destination application process created, the Notify Application Task advances the decision step 3203 as indicated in FIG. 32, and a determination is made as to whether the ACP authorization screening was passed. If the screening was disapproved (and consequently the application program has not been created), decision step 3203 advances the task to step 3204. In step 3204, the work item is deleted from the Notification Task queue 2602 in FIG. 26 and the system status code is set to indicate a failure; the Notification Application Task then advances to step 3205. As a result, no further attempt will be made by the Notification Task to deliver this work item. Alternatively, if the authorization screening had been approved by the ACP process, decision step 3203 advances the task directly to step 3205. In step 3205, the connection from the Notify Application Task to the destination process is taken down and the task then retires in step 3206.

Figure 34:
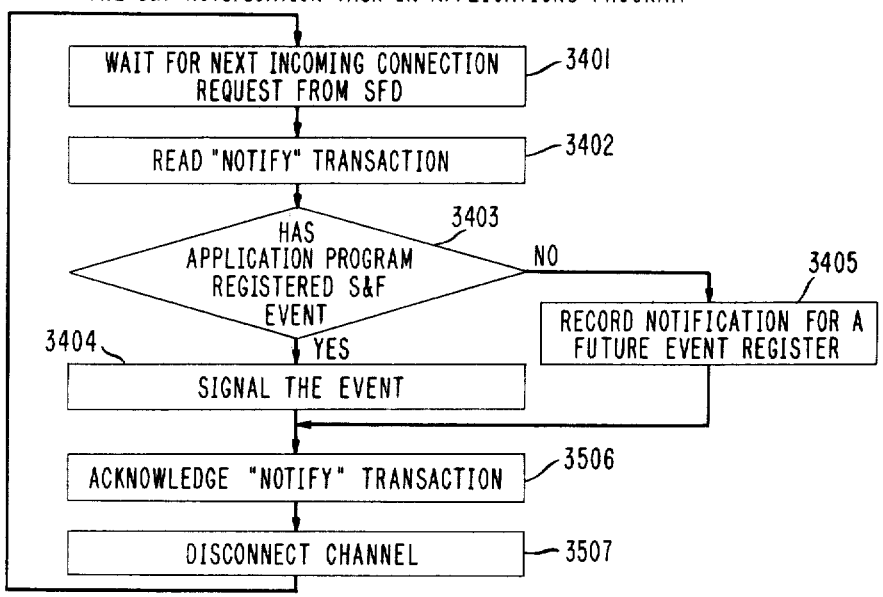
FIG. 34 is a flowchart of the store and forward notification task that is available for use by the application process in the control layer portion of its image.

The control layer in each applications program is arranged such that a supervisory program for AIS runs an initialization script when the application program is created. For a more complete description of an embodiment of the supervisory program, see the patent application by D. A. Zave, Ser. No. 393,123, filed June 28, 1982, and entitled "Computer System with Tasking." One function performed during initialization by the supervisory program is to create a S&F Notification Task in the application program process. This task in the application program waits for an incoming connection request from the S&F Delivery process as indicated in step 3401 of FIG. 34. When such a request is received, the task reads the notify transaction as indicated in step 3402 and proceeds to decision step 3403 wherein it is determined whether the application program has registered a S&F event. If such an event is registered, the event is signaled in step 3404. If not, the notification is recorded for the possible registration of a future event by the application program. An acknowledgment is finally sent to the S&F Delivery process in step 3506 and the channel is disconnected between the S&F Delivery process and the application program in step 3507. In this way the application program is notified via event mechanism that a message is awaiting to be transferred.

Upon execution, the application program, in response to the connection from the Store and Forward Delivery process, allocates appropriate input buffers and starts up appropriate tasks and invokes appropriate primitives to receive the store and forward message. The first determination made by the user process primitives (as described hereinafter) is whether a connection presently exists for delivering a prior store and forward message to the user process. Assuming such connection does not exist, the user process primitive creates the connection to the Store and Forward Delivery process by issuing a request for a channel. This is received by the Incoming Channel Task 701 which, as previously described in connection with FIG. 28, is monitoring for connection requests in step 2801. Decision 2802 thereupon determines that the connection request is from an application program and advances the task to step 2805, which in turn creates the Primitive Request Task 707. The Incoming Channel Task then loops back to step 2801 to wit for the next connection request.

Figure 11:
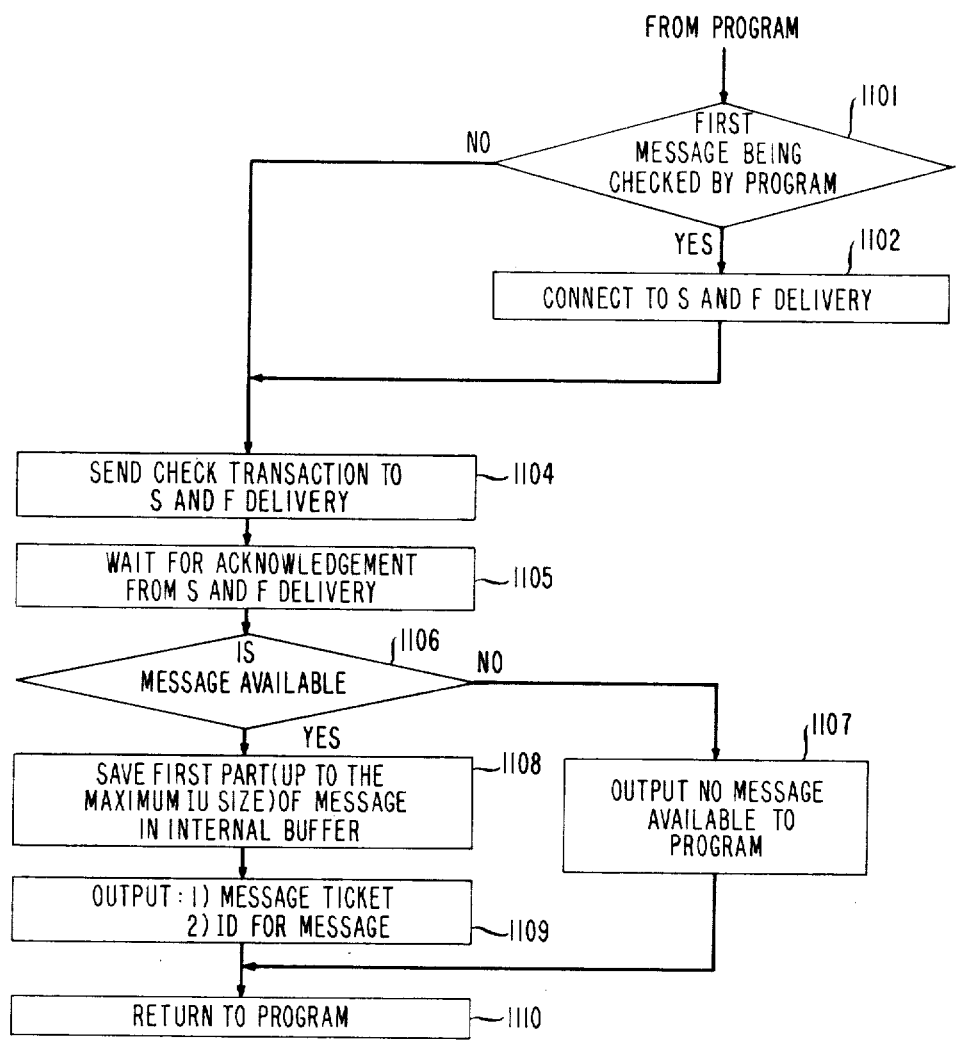
Figure 31:
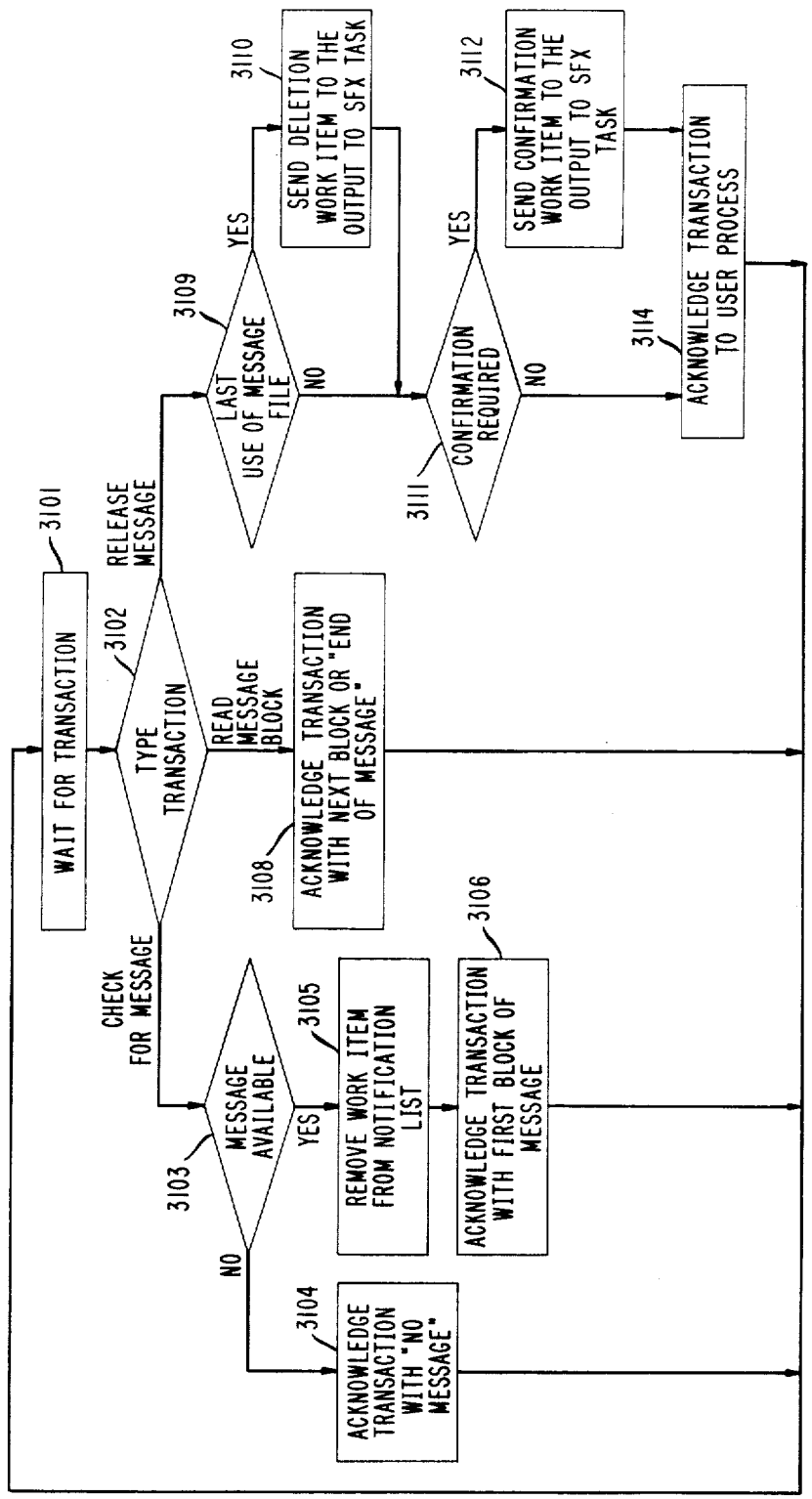

The Primitive Request Task 707, upon being created, advances to step 3101 in FIG. 31 to wait for incoming transactions from the application user process. As described hereinbelow (in connection with FIG. 11), after the completion of the connection from the user process to the Store and Forward Delivery process, a user process primitive sends a "check" transaction to the Store and Forward Delivery process containing the NSA of the user process. When the transaction is received by the Store and Forward Delivery process, the Primitive Request Task advances to decision step 3102 which determines that a check transaction has been received. This advances the task to decision step 3103 which now determines if a store and forward message is, in fact, available for this user process. In the event that no message is available for this user process, decision step 3103 advances the task to step 3104 and, in step 3104, an acknowledgement transaction containing a "no message" statement is returned to the user process. This will presumably terminate the transactions with the user process and presumably the user process will disconnect. It is up to the user process to in fact terminate and disconnect. In the meantime, the Primitive Request Task advances back to step 3101 to wait for the next transaction.

Assume now, in accordance with out scenario, that a store and forward message is available for the user process. Decision step 3103 thereupon advances the Primitive Request Task to step 3105 wherein the work item is removed from the Notification Task list. Now that the user has checked for the message, there is no longer a need to notify the user process that it has a message waiting to be delivered. Next, an acknowledgement transaction is created in step 3106 containing the message ticket and message data. This information unit is then sent back through the connection to the user process. Finally, the Primitive Request Task returns to step 3101.

The user process now having the message ticket (FIG. 14) determines the length of the store and forward message (as noted below) and, issues a read primitive to obtain the message data. The reception of this transaction from the user process advances the Primitive Request Task to decision step 3102 and this decision step, determining that a "read" transaction has been received from the user process, advances the task to step 3108. Accordingly, in step 3108, the next data block of the message is read out (of the message file) and sent back through the channel to the user process. Alternatively, if all the message data has been priorly sent and there is no further message data, step 3108 generates an end-of-message error transaction and sends this transaction back to the user process. In either event, after the transaction is sent to the connection, the Primitive Request Task loops back to step 3101.

When the user process is satisfied that it has received the entire store and forward message, it returns a release transaction to the Store and Forward Delivery process. This advances the Primitive Request task to decision step 3102 and the decision step, upon determining that a release transaction has been received, advances the task to decision step 3109. In decision step 3109, a determination is made as to whether the store and forward message has been delivered to all of the appropriate local user processes. If it has been delivered to all user processes, decision step 3109 advances the task to step 3110 where a delete work item is given to the Output to SFX Task 703. The task then advances to decision step 3111. Alternatively, if there are other destinations for the store and forward message and, therefore, further user processes will be receiving the message, decision step 3109 advances the task directly to decision step 3111 without sending a delete work item. Decision step 3111 determines whether the originating user process requested a confirmation for the store and forward message. If such a confirmation was requested, decision step 3111 advances the task to step 3112.

Figure 27:
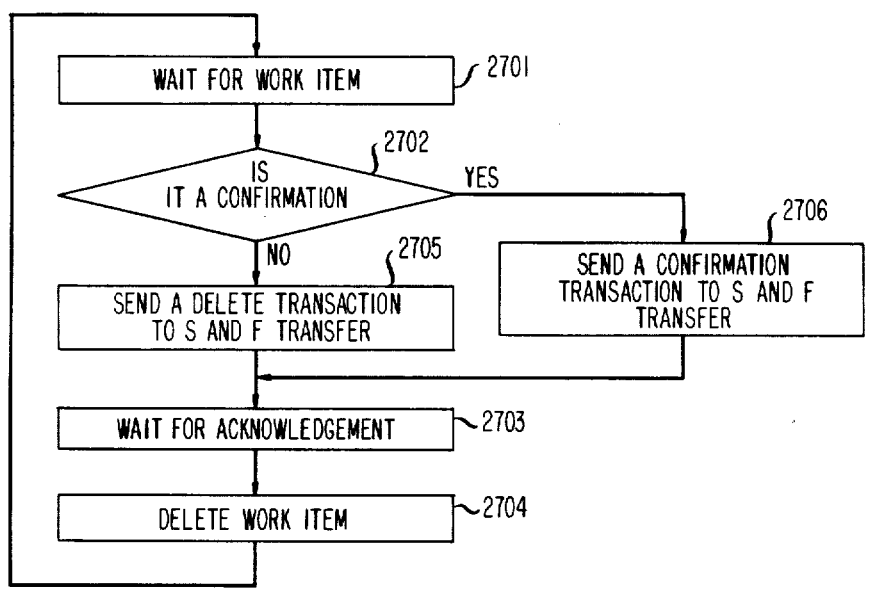

In step 3112, a work item is transmitted to the Output to SFX Task 703. As indicated in FIG. 27, this output task is normally waiting for a work item as indicated by step 2701. In response to the work item, a transaction is forwarded to the Store and Forward Transfer process whose Listen Task recognizes that the transaction is from the Delivery Process which causes the Listen Task in FIG. 20 to proceed to step 2008. This step in turn advances the Listen Task to step 2012 which creates a Delivery Input Task 607. The transaction to the S&F Transfer Process is either a delete (indicating that the message file is no longer needed for local destinations) or a confirmation transaction (indicating that a confirmation message should be sent). The output to SFX task in FIG. 27 waits for an acknowledgement from the Store and Forward Transfer process that the transaction has been received in step 2703. When received, the Output to SFX task deletes the work item in step 2704 and returns to wait for another work item in step 2701.

Figure 23:
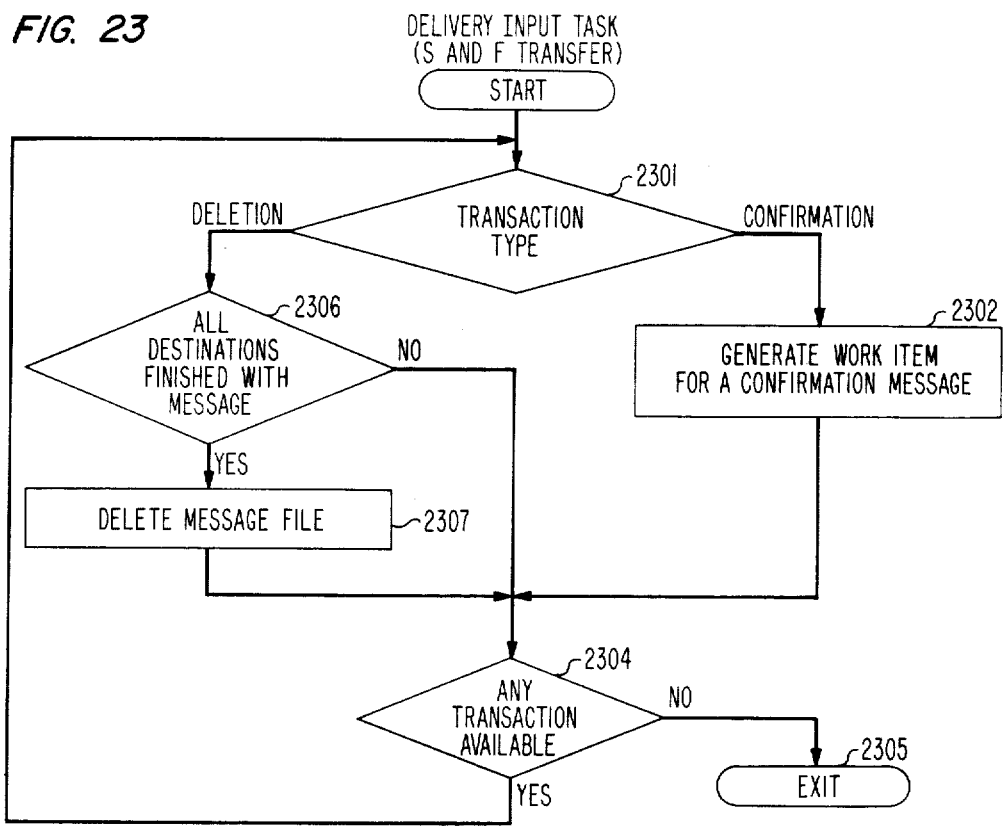

The Delivery Input Task, when created, proceeds to the decision step 2301 in FIG. 23. If the transaction is of the confirmation type, the decision step 2301 causes the Delivery Input Task to proceed to 2302 wherein a work item is generated for a confirmation message. Next, the task proceeds to decision step 2304 wherein a decision is made as to whether any further transactions are available. If none are available, the task simply exits as indicated in step 2305. Otherwise the task proceeds to decision step 2301 where a determination is again made as to whether the next transaction is a confirmation type or deletion type.

If the transaction is a deletion type transaction, the Delivery Input Task proceeds from decision step 2301 to decision step 2306 wherein it is determined whether all destinations are finished with the message. If they are, the message file is deleted as indicated in step 2307 and the task proceeds to decision step 2304. If all destinations are not finished with the message, the task proceeds from decision step 2306 to decision step 2304.

When a confirmation work item is generated in step 2302, a confirmation message is composed and a connection request is originated back to a remote Store and Forward Transfer process by Send Task 604, assuming the confirmation is located in a remote node. Otherwise the delivery process is notified of a local message. This confirmation transaction is thus forwarded to the remote Store and Forward Transfer process by way of a new connection. The creation of this new connection is monitored by the Listen Task in the remote Store and Forward Transfer process. The Listen Task, upon reading the confirmation transaction, creates a Receive Task to handle the confirmation message.

Assume now that confirmation is not required for the store and forward message. In this event, decision step 3111 of the Primitive Request Task advances the task to step 3114 wherein an acknowledgment transaction is composed, and this transaction is sent to the user process whereupon the user process presumably disconnects from the Store and Forward Delivery process. The Primitive Request task then loops back to step 3101 to wait for the next transaction.

At the destination user process, the application program examines the connect request from the Notify Application Task and determines which process originated the call. Since, in this scenario, it is assumed that the Store and Forward Delivery process is originating the call, the application process invokes the Store and Forward (S & F) Check primitive (FIG. 11) which, upon being invoked, advances to decision step 1101 to determine whether messages are presently being delivered to the application process by the Store and Forward Delivery process (and if there is presently a connection for delivering these messages) or whether this is a "first" message delivery and requires the creation of a connection. Assuming that this is a "first" message, the S & F Check primitive advances to step 1102. In step 1102, a connection is established to the Store and Forward Delivery process and the S & F Check primitive advances to step 1104. In step 1104, a "check" transaction is generated, which transaction includes the NSA of the destination process, and the "check" transaction is sent to the Store and Forward Delivery process. The primitive waits for an acknowledgment in step 1105, and, the S & F Check primitive advances to decision step 1106. If no message is available, the primitive provides the application program with the information that no message is available as shown in step 1107. If a message is available, the message ticket and a part of the message is received from the Primitive Request Task of the Store and Forward Delivery process (as described above). Also, an internal buffer, having the size of an information unit, is allocated and the message data is saved in the internal buffer as indicated in step 1108. In the next step 1109, the message ticket is provided to the destination application user process, and a message ID is generated and also provided to the destination user process to enable the user process to subsequently refer to the store and forward message. Control is thereupon returned to the user process in step 1110.

Figure 12:
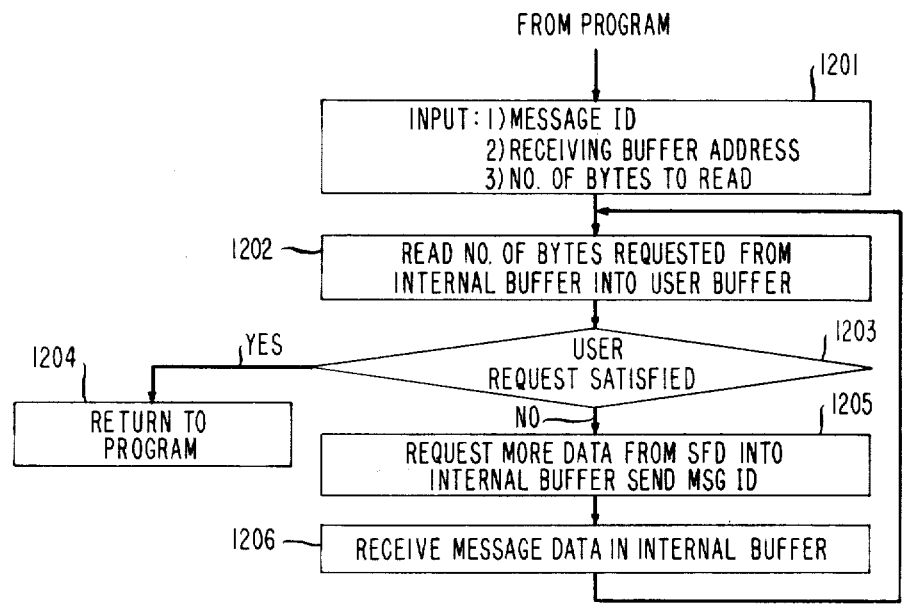

When the user process receives the message ticket, it may invoke the Store and Forward (S & F) Read Primitive shown in FIG. 12. This advances the S & F Read Primitive to step 1201 where it obtains the message ID, an address of a buffer internal to the destination user process for storing the message and a statement as to the number of bytes that the user process desires to read from the S & F Check Primitive buffer. This number of bytes usually is based on two fractors, namely, the size of the primitive buffer and the size of the message as defined in the message ticket. Thus, the user process generally continues to request data, in IU or buffer quantities up to the "size" of the message. The Store and Forward Read Primitive then proceeds to read the designated number of bytes out of the S & F Check Primitive buffer, copying the bytes into the internal buffer of the user process as indicated in step 1202 of FIG. 12. The S & F Read Primitive then proceeds to decision step 1203 to determine whether the S & F Check Primitive internal buffer was exhausted by the copying. If the specified number of bytes have been placed into the user buffer, the S & F Read Primitive retires and control is returned to the program in step 1204 since the request has been satisfied. Otherwise, the request has not been satisfied and more data is needed for placement into the S & F Check Primitive buffer. The primitive advances to step 1205.

In step 1205, a command is sent to the Store and Forward Delivery process (together with the message ID) to obtain more message data. In the next step 1206, more message data is received in the primitive internal buffer from the Store and Forward Delivery process, and the S&F Read primitive loops back to step 1202. Since more message data has now been stored in the S & F Check primitive buffer, copy of the data into the buffer of the user process is repeated until the user specified number of bytes have been read or the end of message has been reached, whereupon the user process (knowing the message length), terminates requesting further bytes and the primitive retires.

Figure 13:
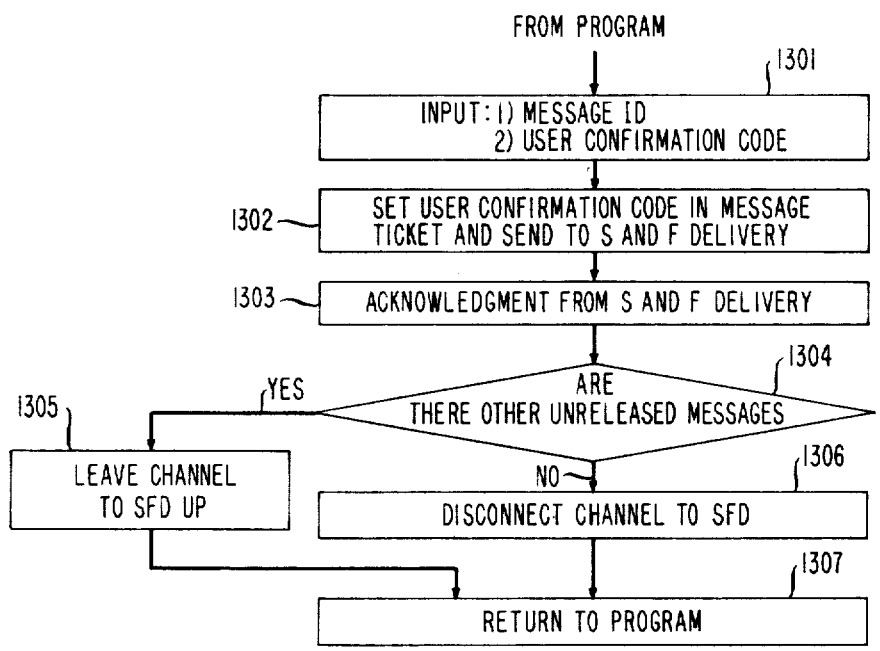

The user process then invokes the sf_rlse primitive The sf_rlse primitive, upon being invoked, advances to step 1301 in FIG. 13. In step 1301, the primitive obtains from the user process the message ID and the application specified confirmation code if this message requires confirmation. A transaction is then composed and sent back to the Store and Forward Delivery process in step 1302.

When an acknowledgement to the transaction is returned by the Store and Forward Delivery process in step 1303, the Release Message Primitive advances to decision step 1304. In decision step 1304, a determination is made as to whether there are other store and forward messages still to be released or are being released by this application program from the Store and Forward Delivery process. If there are other messages still to be released, the primitive advances to step 1305 to maintain the channel in existence and then the primitive exits in step 1307. Alternatively, if there are no further messages to be released, the primitive advances to step 1306 which terminates the connection with the Store and Forward Delivery process. The task then proceeds to step 1307 where it exists.

The user process in possession of the store and forward message may include a user specified header, which designates the ultimate destinations, and may distribute the message as defined in the header. For example, the user process can extend a call to the data base service (in a manner similar to the method of extending the call to such service, as described above) to place the store and forward message in the customer's file.

Alternatively, the user process might extend the call to a Station Call Facility task as identified by an NSA in the message header. Passage of this data to the Station Call Facility task will send the data to a terminal. Thus, the store and forward message composed in response to the command from the originating terminal user is eventually delivered in accordance with the originating terminal user's command or in accordance with header information in the header file to ultimate destinations, such as the customer's files or other terminals.

Figure 35:
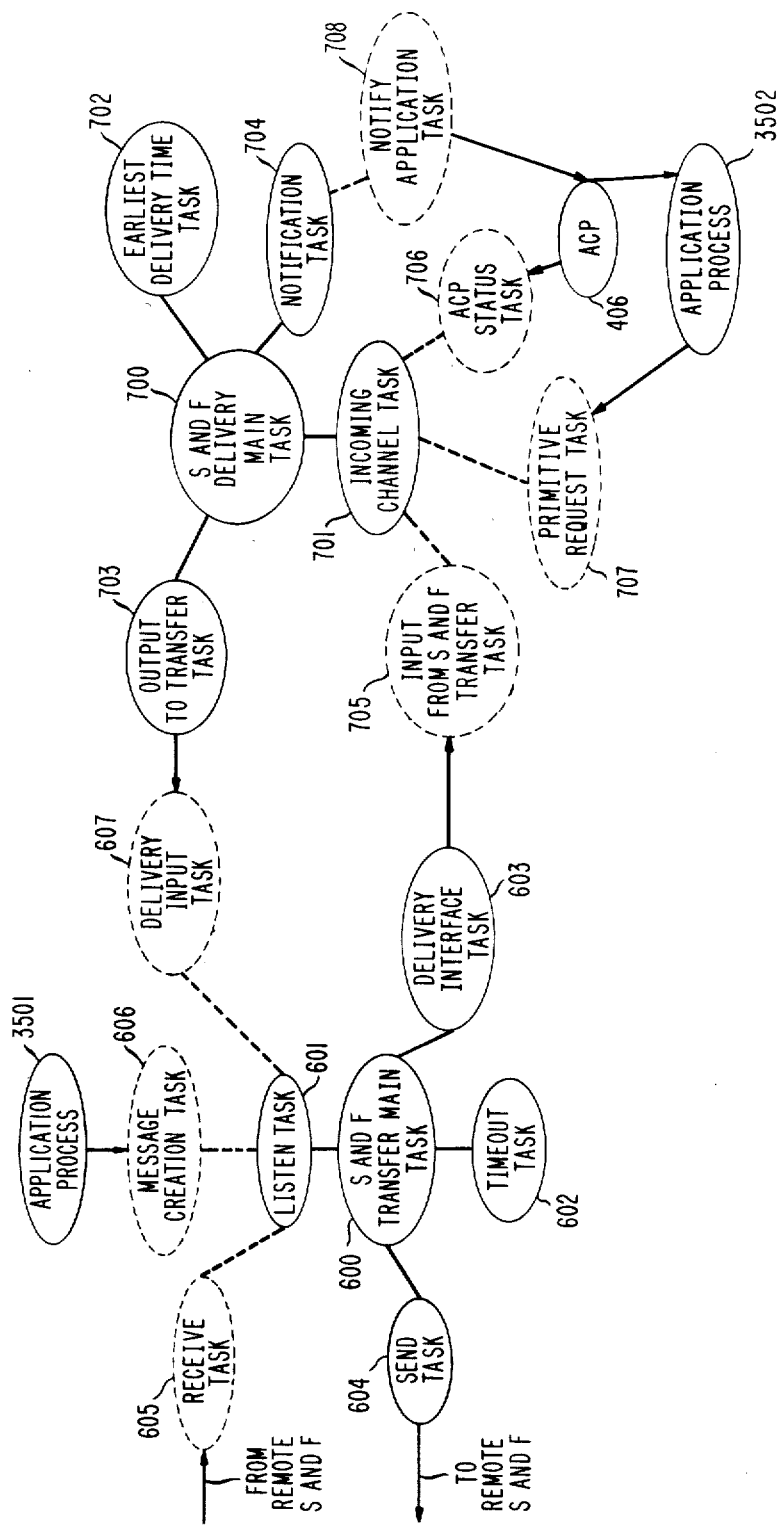
FIG. 35 is a diagram which illustrates the flow of information between the various tasks of the store and forward system and the application processes that use that system.

A summary of the transactions that take place between the various tasks of the Store and Forward subsystem, the Application Control program, and Application Processes is illustrated in FIG. 35. In this figure, the permanent tasks are all shown with solid outlines whereas the temporary tasks are shown with dotted outlines. All of the transactions are not shown in this figure in order to maintain a simplified showing of the main flow of information. For example, any communications from a remote Store and Forward Transfer system, from an application process, or from the delivery process takes place with the transfer process by first communicating with the Listen Task 601. This task in turn sets up the appropriate temporary task in order to continue with the transaction. Similarly, all communications that are incoming to the delivery process first communicate with the Incoming Channel Task 701, and this task in turn creates an appropriate temporary task in order to carry on with the transaction. As illustrated in FIG. 35, application process 3501 is a process which is originating a message to be transferred to another process whereas application process 3502 is a process that is receiving a message. The arrows on each of the solid transfer lines indicate the direction for the flow of information. Details for all of the transactions have been described in detail hereinabove.

What is claimed is:

1. A store and forward communications system for transferring messages from an originating computer process to a destination computer process comprising
    means for creating a message file in response to instructions from said originating computer process,
    means for delivering a message to said destination computer process,
    means for transferring information in said message file to said means for delivering
    characterized in that said means for delivering includes means for creating said destination computer process from a destination program, means for notifying said means for creating said destination computer process that a message is available for delivery to said destination computer process, and
    means responsive to a release request from said destination computer process for generating a confirmation message to be transferred and delivered to a computer process specified by said originating computer process.

2. A store and forward communications system for transferring messages from an originating computer process to a destination computer process comprisisng
    means for creating a message file in response to instructions from said originating computer process,
    means for delivering a message to said destination computer process,
    means for transferring information in said message file to said means for delivering
    characterized in that said means for delivering includes means for creating said destination computer process from a destination program, and means for notifying said means for creating said destination computer process that a message is available for delivery to said destination computer process,
    said means for notifying includes a work item list of the messages to be delivered that is ordered in accordance with the time at which notification is to be tried.

3. A communication system as defined in claim 2 wherein said means for notifying includes means for deleting a work item from said work item list when said means for creating fails to create said destination computer process.

4. A store and forward communications system for transferring messages from an originating computer process to a destination computer process comprisisng
    means for creating a message file in response to instructions from said originating computer process,
    means for delivering a message to said destination computer process,
    means for transferring information in said message file to said means for delivering
    characterized in that the message information to be transferred includes a designated earliest delivery time, said means for delivering includes means for creating said destination computer process from a destination program, means for notifying said means for creating said destination computer process that a message is available for delivery to said destination computer process,
    said means for delivering further includes an earliest delivery time work item list that is ordered in accordance with the earliest delivery time, and
    means for inserting a work item into said work item list in response to message information received from said means for transferring.

5. A communication system as defined in claim 4 wherein said means for notifying includes
    means for maintaining a notification time work item list that is ordered in accordance with the time at which notification of the destination computer process is to be tried, and
    means for removing a work item from said earliest delivery time work item list and sending that work item to said notification time work item list when the time specified in said earliest delivery time work item is reached.

6. A communication system having a plurality of nodes for transmitting a message from an originating computer process in one of said nodes to one or more destination computer processes in one or more of said nodes, said message having a message ticket associated with it that specifies a destination address and grade of service to be given to the transfer of said message, said system comprising means for creating a message file in response to a request from an originating computer process, means for generating a work item list for each of the nodes having a destination computer process to which a message is to be transmitted, each work item list having several levels each one of which corresponds to a different grade of service, each work item corresponding to a different destination computer process, and means for transferring and delivering information from said message file to a destination computer process corresponding to the destination address in said message ticket when the work item for that destination computer process is at the head of a queue corresponding to that grade of service, the work items for the highest grade of service being transferred before work items having a lower grade of service.

7. A communication system as defined in claim 6 wherein said means for transferring and delivering includes means for examining the work items on all of the queues corresponding to a grade of service other than the highest grade of service to determine whether any work item has remained on a queue longer than a predetermined time limit, and means responsive to an indication that a work item has exceeded the predetermined time limit on a queue for placing that work item on a queue corresponding to the next highest grade of service.

8. A combination for delivering messages to their destination computer processes, each of the messages having a destination address which specifies the destination to which the message is to be delivered and an earliest delivery time for the message, said combination comprising means for creating at least one work item corresponding to each of the destinations to which the messages are to be delivered, means for keeping at least one list of work items that is ordered in accordance with predetermined criteria, means responsive to the work item list for creating a computer process corresponding to the destination to which a particular message is to be delivered, means responsive to a request from the created computer process for delivering the message to the created computer process, and means responsive to a release request from the created computer process for generating a confirmation message if the message delivered to said created computer process included a request for confirmation.

9. The combination as defined in claim 8 wherein the means for keeping said at least one list of work items orders the list in accordance with the earliest delivery time for each of the messages.

10. The combination as defined in claim 9 wherein the combination further includes means for keeping a second list of work items that is ordered in accordance with a notification time at which time delivery of the message is attempted.

11. The combination as defined in claim 8 wherein the means for keeping said at least one list of work items orders the list in accordance with a notification time at which time an attempt is made to accomplish delivery of the message.

12. The combination as defined in claim 8 wherein the combination further includes a means responsive to the created computer process for removing a work item said at least one list of work items.

13. A system for delivering messages to computer processes that can be created for execution on one of several processors, each of said messages having information that specifies an earliest delivery time, said system comprising, means for creating one work item corresponding to each of the messages that are to be delivered to an executing computer process, means for keeping a first work item list that is ordered by the earliest delivery time specified in each of the messages corresponding to said work items, means for keeping a list of processors that indicates which processors are not accepting the delivery of messages, and means responsive to said first work item list and said list of processors for delivering a message to a computer process providing the process executes on a processor that will accept delivery.

14. A system as defined in claim 13 wherein the means for delivering a message includes, means for keeping a second work item list that is ordered in accordance with a notification time at which time the delivery of a message is to be attempted, and means for creating the computer process to which a message is to be delivered.

15. A system as defined in claim 14 wherein the system further includes means responsive to a transaction from the created process for removing the work item from said second work item list.

16. A system as defined in claim 13 wherein the system further includes, means for keeping a second work item list that is ordered in accordance with a notification time at which time the delivery of a message is to be attempted, and means responsive to said executing computer process for removing the work item from said second work item list.

* * * * *